(12) United States Patent
Matsumoto

(10) Patent No.: US 6,690,445 B2
(45) Date of Patent: Feb. 10, 2004

(54) LIQUID CRYSTAL DISPLAY HAVING PARTICULAR SPACERS AND CONCAVES

(75) Inventor: Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 178 days.

(21) Appl. No.: 09/839,480

(22) Filed: Apr. 20, 2001

(65) Prior Publication Data

US 2001/0033358 A1 Oct. 25, 2001

(30) Foreign Application Priority Data

Apr. 21, 2000 (JP) .......................................... 2000-121605

(51) Int. Cl.$^7$ ............................................ G02F 1/1339
(52) U.S. Cl. ......................... 349/155; 349/156; 349/157
(58) Field of Search .................................. 349/156, 157, 349/155, 158, 141, 154

(56) References Cited

U.S. PATENT DOCUMENTS

| | | | |
|---|---|---|---|
| 5,828,434 A | | 10/1998 | Koden et al. |
| 6,016,181 A | * | 1/2000 | Shimada ..................... 349/156 |
| 6,049,370 A | * | 4/2000 | Smith, Jr. et al. ............ 349/156 |
| 6,097,467 A | * | 8/2000 | Fujimaki et al. ............. 349/155 |
| 6,187,485 B1 | * | 2/2001 | Matsushima et al. .......... 430/7 |
| 6,259,500 B1 | * | 7/2001 | Kijima et al. ................ 349/113 |
| 6,266,121 B1 | * | 7/2001 | Shigeta et al. ............... 349/156 |
| 6,275,280 B1 | * | 8/2001 | Kajita et al. ................. 349/155 |
| 6,437,847 B1 | * | 8/2002 | Kishimoto ................... 349/155 |
| 2002/0011182 A1 | * | 1/2002 | Matsda et al. .......... 106/287.11 |
| 2002/0113936 A1 | * | 8/2002 | Yanagawa et al. ........... 349/155 |

FOREIGN PATENT DOCUMENTS

| | | |
|---|---|---|
| JP | 6-175156 | 6/1994 |
| JP | 10-96955 | 4/1998 |
| JP | 10-228023 | 8/1998 |

* cited by examiner

Primary Examiner—Tarifur R. Chawdhury
Assistant Examiner—Mike Qi
(74) Attorney, Agent, or Firm—Choate, Hall & Stewart

(57) ABSTRACT

A liquid crystal display apparatus using a thin film transistor, includes first and second substrate sections and a liquid crystal layer provided between the first substrate section and the second substrate section. A supporting spacer extends from the first substrate section. The second substrate section has a concave section. The tip portion of the supporting spacer engages the concave section to keep a gap from the first substrate section.

18 Claims, 29 Drawing Sheets

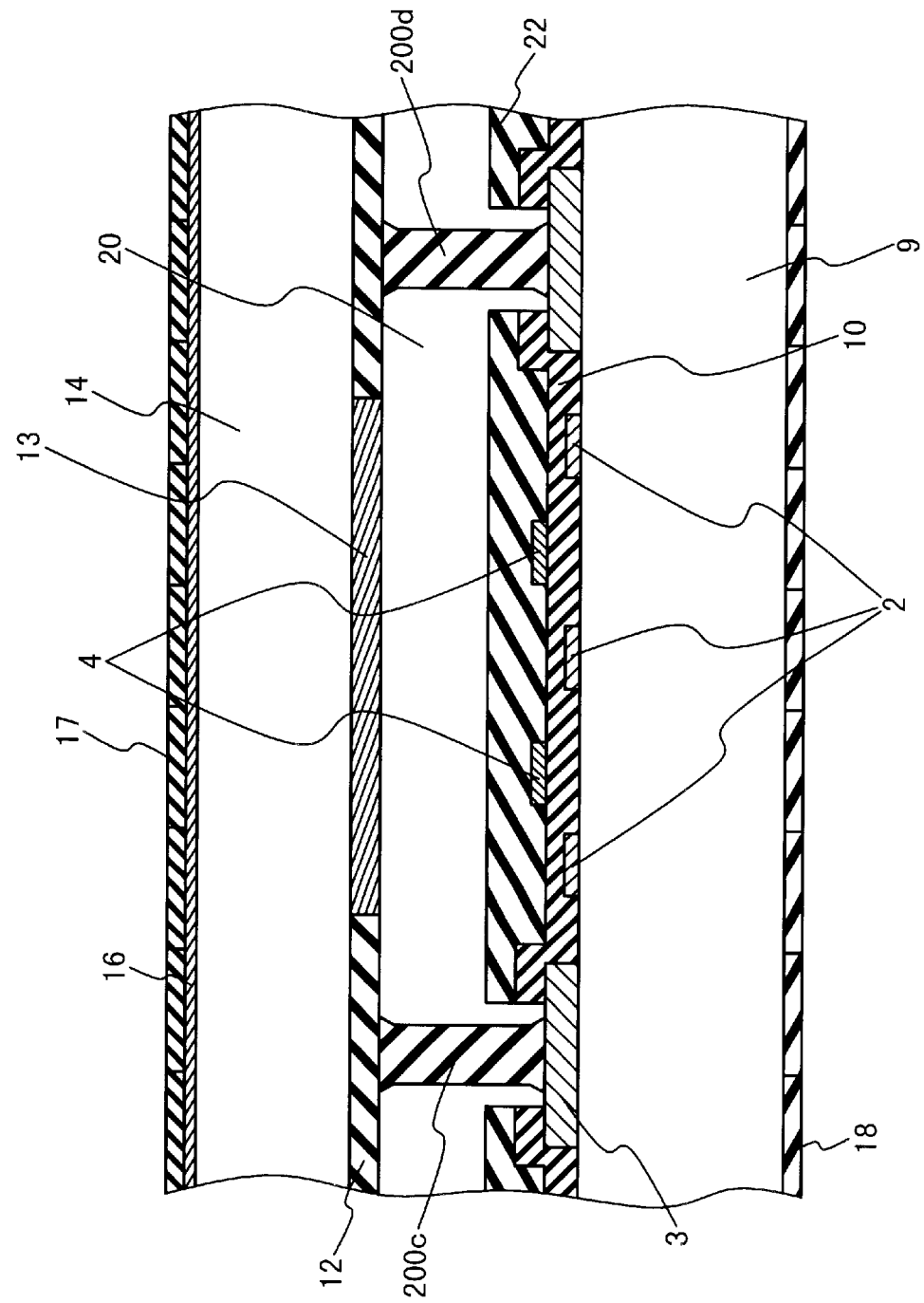

B-B'

C-C'

LIQUID CRYSTAL DISPLAY HAVING PARTICULAR SPACERS AND CONCAVES

BACKGROUND OF THE INVENTION

1. Field of the Invention

The present invention relates to a liquid crystal display apparatus provided with a support spacer for holding a cell gap for a liquid crystal layer.

2. Description of the Related Art

Various kinds of liquid crystal display apparatuses using thin-film transistors (TFTs) are known in accordance with forms. For one of the forms, a liquid crystal display apparatus using an inverted stagger type thin-film transistor is exemplified. The liquid crystal display apparatus will be described referring to the liquid crystal display apparatus using the inverted stagger type thin-film transistor.

When the cell gap for a liquid crystal layer is formed between transparent substrates, spacers are used. By the spacers, the uniformity of the cell gap can be improved in the liquid crystal display apparatus with the large size substrates.

FIG. 1 shows a concept of the spacer in a conventional example of the liquid crystal display apparatus. In FIG. 1, support spacers 500c and 500d are used. The supporting spacers 500c and 500d are located in regions corresponding to light shielding layers (black matrix) 12. A color filter (color layer) 13 is arranged between the light shielding layers 12 in a lateral direction. A transparent substrate 14 is located above the color filter 13 and the light shielding layers 12.

FIG. 2 is a schematic cross sectional view of an in-phase switching type liquid crystal display apparatus in a first conventional example. A display cell 501 is composed of a polarizing plate 17 and an electric conducting layer 16 formed on the front surface of a transparent substrate 14, a color filter 13 and flattening films or light shielding layers 12 formed on the back surface of the transparent substrate 14 and the supporting spacers 500c and 500d extending from the light shielding layers 12. The display cell 501 is composed of a passivation film 22, an interlayer insulating film 10, a gate electrode 3 and a common electrode 4 formed on the front surface of a transparent substrate 9, and a polarizing plate 18 formed on the back surface of the transparent substrate 9. The supporting spacers 500c and 500d are adhered to the light shielding layers 12 and the passivation film 22. The adhesion of the supporting spacer to the light shielding layer 12 on the side of the transparent substrate 14 is higher than that of the supporting spacer to the passivation film 22 on the side of the transparent substrate 9. Consequently, when an external pressure is applied to the display cell 501, the supporting spacers 500c and 500d are moved from specified positions on the side of the passivation film 22 because of the external pressure. The movement of the supporting spacers 500c and 500d induces color irregularity.

FIG. 3 is a plan view of the display cell of a second conventional example of the in-phase switching type liquid crystal display apparatus. A display cell 502 is composed of an amorphous silicon film 1, a pixel electrode 2, a gate electrode 3, a common electrode 4, data line 5, source electrode 6, a drain electrode 7, and a supporting spacer 500. FIG. 4 is a cross sectional view of the display cell 502 in a region of the supporting spacer 500 along the line X–X' of FIG. 3. In FIG. 4, the upper substrate section of the display cell is composed of a polarizing plate 17 and an electric conducting layer 16 formed on the front surface of a transparent substrate 14, and a black matrix layer 12, a color layer (color filter) 13, a flattening film 15, and an orientation film 11 formed on the back surface of the transparent substrate 14. A part of the flattening film 15 functions as the supporting spacer 500. The surface of the supporting spacer 500 is covered by the orientation film 11. In FIG. 4, the lower substrate section of the display cell 500 is composed of an orientation film 11, a passivation film 22, an interlayer insulating film 10 and a gate electrode 3 formed on the front surface of a transparent substrate 9, and a polarizing plate 18 formed on the back surface of the transparent substrate 9. A liquid crystal layer 20 is formed in the cell gap supported by the supporting spacer 500. The supporting spacer 500 has the low adhesion on the side of the lower substrate section of the display cell 500. Accordingly, when the display cell is pressed, the supporting spacer 500 may be moved. If the supporting spacer 500 moves, color irregularity is caused.

FIG. 5 is a plan view of a display cell in a third conventional example of an in-phase switching type liquid crystal display apparatus. A display cell 503 is composed of an amorphous silicon film 1, a pixel electrode 2, a gate electrode 3, a common electrode 4, a data line 5, a source electrode 6, a drain electrode 7, and a supporting spacer 500. In the display cell 503, the supporting spacer 500 is arranged on the gate electrode 1. FIG. 6 is a cross sectional view of the display cell 503 in a region of the supporting spacer 500 along the line Y–Y' in FIG. 5. In FIG. 6, the upper substrate section of the display cell is composed of a polarizing plate 17 and an electric conducting layer 16 formed on the front surface of a transparent substrate 14, and a black matrix layer 12, a color layer (color filter) 13, a flattening film 15, and an orientation film 11 formed on the back surface of the transparent substrate 14. A part of the flattening film 15 functions as the supporting spacer 500. On the other hand, the lower substrate section of the display cell 503 is composed of the orientation film 11, a passivation film 22, an interlayer insulating film 10 and a gate electrode 3 formed on the front surface of a transparent substrate 9, and a polarizing plate 18 formed on the back surface of the transparent substrate 9. The passivation film 22 is formed to have a concave section. The supporting spacer 500 is loaded in the concave section. The liquid crystal layer 20 is formed in the cell gap formed by the supporting spacer 500.

Because the supporting spacer 500 is loaded on the concave section, the resistance against the movement in the lateral direction is higher than in the supporting spacer shown in FIGS. 3 and 4. However, since the depth of the concave section is extremely shallow, the improvement of the strength of a great extent cannot be expected. Consequently, when the display cell is externally pressed, the supporting spacer 500 may be moved. If the supporting spacer 500 moves, color irregularities result.

FIG. 7 shows a plan view of the display cell of a fourth conventional example of the in-phase switching type liquid crystal display apparatus. The display cell 504 is composed of an amorphous silicon film 1, a pixel electrode 2, a gate electrode 3, a common electrode 4, a data line 5, a source electrode 6, a drain electrode 7, and supporting spacers 500a and 500b. In the display cell 504, the supporting spacers 500a and 500b are located on the data lines 5. FIG. 8 is a cross sectional view of the display cell 504 in the region of the supporting spacers 500a and 500b along the line Z–Z' in FIG. 7. In FIG. 8, the upper substrate section of the display cell 504 is composed of a polarizing plate 17, an electric conducting layer 16 formed on the front surface of a transparent substrate 14, and a black matrix layer 12, a color layer (color filter) 13, a flattening film 15, and an orientation film 11 formed on the back surface of the transparent substrate 14. A part of the flattening film 15 is formed to have the supporting spacers 500a and 500b. In FIG. 8, the lower substrate section of the display cell 504 is composed of an orientation film 11, s passivation film 22, data lines 5 and 5', pixel electrodes 2, an interlayer insulating film 10, and common electrodes 4 formed on the front surface of a transparent substrate 9, and a polarizing plate 18 formed on the back surface of the transparent substrate 9.

The liquid crystal layer 20 is provided in the cell gap supported by supporting spacers 500a and 500b. The supporting spacers 500a and 500b provides the low adhesion on the side of the transparent substrate 9 as in the case of the supporting spacer 500 shown in FIGS. 3 and 4. When the display cell is externally pressed, the supporting spacers 500a and 500b be moved. If the supporting spacers 500a and 500b are moved, color irregularities result.

In the conjunction with the above description, a liquid crystal display is disclosed in Japanese Laid Open Patent application (JP-A-Heisei 6-175156). In this reference, the liquid crystal display is composed of a substrate on which a thin film transistor is formed to drive liquid crystal and a substrate on which a transparent electrode is formed. A liquid crystal layer is formed between the substrates. A black matrix layer is formed on the substrate on which the above-mentioned thin film transistor is formed. A source wiring of the above-mentioned thin film transistor is used for the black matrix layer. A light shielding section is formed in an island manner to overlap the matrix layer through a gate wiring of the thin film transistor of a previous stage and an insulating film. Also, the light shielding section is electrically connected with a drain electrode through the insulating film.

Also, a liquid crystal display apparatus is disclosed in Japanese Laid Open Patent application (JP-A-Heisei 10-96955). In this reference, the liquid crystal display apparatus is composed of a first substrate in which a plurality of address wiring lines, a plurality of data wiring lines and a plurality of switching elements are formed on an insulation substrate, a pixel electrode 2 is formed on the switching element via an insulating film, and an auxiliary capacity section is electrically connected to the pixel electrode 2. The liquid crystal display apparatus is further composed of a second substrate in which a counter electrode is formed on an insulation substrate, and a liquid crystal layer between the first and second substrates. The auxiliary capacity electrode is composed of an auxiliary capacity electrode formed in the same layer as the data wiring line, an auxiliary capacity electrode located on the counter side to the an auxiliary capacity electrode via an insulating film. A column spacer is accommodated in a contact hole for a contact between the auxiliary capacity electrode and the pixel electrode to keep a gap from the second substrate.

Also, a liquid crystal display apparatus is disclosed in Japanese Laid Open Patent application (JP-A-Heisei 10-228023). In this reference, the liquid crystal display apparatus is composed of a liquid crystal layer between substrates with electrodes. The liquid crystal display apparatus is further composed of an orientation control layer, an organic material layer which has a shape memory characteristic, and a spacer which is formed to have a wall or column shape on the orientation control layer. A rubbing process to the orientation control layer is carried out after the formation of the spacer, and a heating process to a glass transition point or above is carried out after the rubbing process.

SUMMARY OF THE INVENTION

Therefore, an object of the present invention is to provide a liquid crystal display apparatus in which the strength of a supporting spacer can be improved.

Another object of the present invention is to provide a liquid crystal display apparatus in which a cell gap can be uniformly kept so that display irregularities can be made less.

In an aspect of the present invention, a liquid crystal display apparatus using a thin film transistor, includes first and second substrate sections and a liquid crystal layer provided between the first substrate section and the second substrate section. A supporting spacer extends from the first substrate section. The second substrate section has a concave section. The tip portion of the supporting spacer engages the concave section to keep a gap from the first substrate section.

Here, the supporting spacer may have an extending portion in the tip portion in a direction orthogonal to a direction to which the supporting spacer extends.

Also, the supporting spacer may be covered by an orientation film, and the concave section may be covered by an orientation film.

Also, when the thin film transistor has a gate electrode, a source electrode connected to a pixel electrode and a drain electrode connected to a data line extending in a direction orthogonal to a direction of the gate electrode, the supporting spacer and the concave section may be provided above the gate electrode. In this case, one of the first and second substrate sections desirably includes the pixel electrode and a common electrode provide to drive liquid crystal molecules together with the pixel electrode. Alternatively, one of the first and second substrate sections may include the pixel electrode, and the other of the first and second substrate sections may include a common electrode provided to drive liquid crystal molecules together with the pixel electrode.

Also, when the thin film transistor has a gate electrode, a source electrode connected to a pixel electrode and a drain electrode connected to a data line extending in a direction orthogonal to a direction of the gate electrode, the supporting spacer and the concave section may be provided above the data line. In this case, one of the first and second substrate sections may include the pixel electrode, and a common electrode provide to drive liquid crystal molecules together with the pixel electrode. Alternatively, one of the first and second substrate sections may include the pixel electrode, and the other of the first and second substrate sections may include a common electrode provided to drive liquid crystal molecules together with the pixel electrode.

Also, the supporting spacer may be formed of organic material or inorganic material.

Also, the first substrate section may include a first transparent substrate, a light shielding layer formed in a region other than a pixel region on an opposing surface of the first transparent substrate to the second substrate section, and a flattening film formed to cover the light shielding layer. At this time, the supporting spacer is desirably formed in a region where the light shielding layer is formed. In this case, the supporting spacer may be formed from a part of the flattening film. Also, the flattening film is desirably formed of transparent material.

Also, the supporting spacer may be adhered to the first substrate section. In this case, the first substrate section may have another concave section with which the supporting spacer engages, and the supporting spacer is adhered to the other concave section. In this case, the supporting spacer may be formed of metal or organic material.

BRIEF DESCRIPTION OF THE DRAWINGS

FIG. 23 is a cross sectional view of the supporting spacer according to a fifth embodiment of the present invention affects a present invention;

DESCRIPTION OF THE PREFERRED EMBODIMENTS

Hereinafter, a liquid crystal display apparatus of the present invention will be described in detail with reference to the attached drawings. In the following description, a liquid crystal display apparatus using an inversed stagger type thin-film transistor is taken for an example. However, the present invention is not limited to this.

Figure 1:
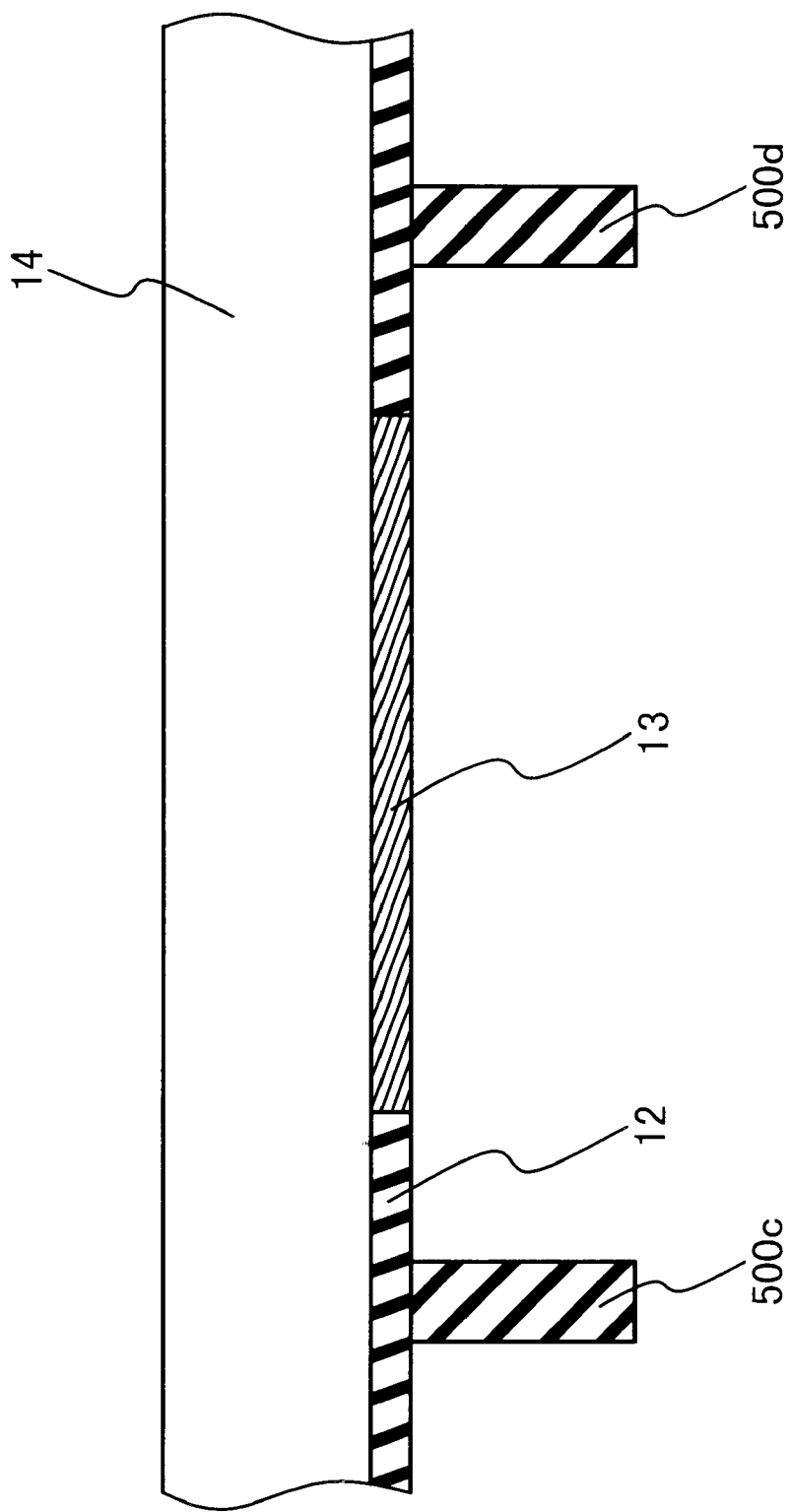
FIG. 1 shows a concept of the spacer in a conventional example of the liquid crystal display apparatus.
Figure 2:
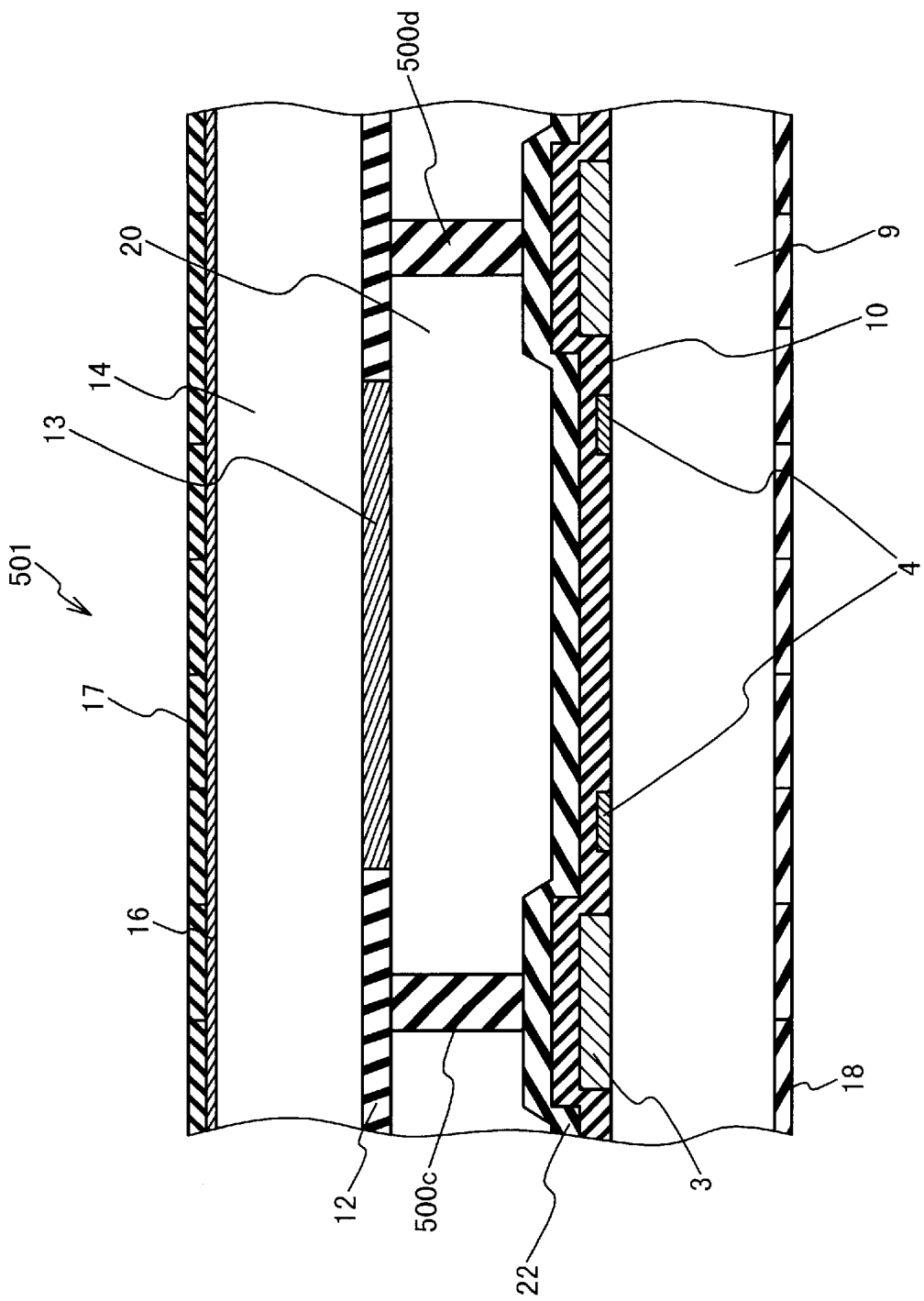
FIG. 2 is a schematic cross sectional view of a first conventional example of an in-phase switching type liquid crystal display apparatus.
Figure 3:
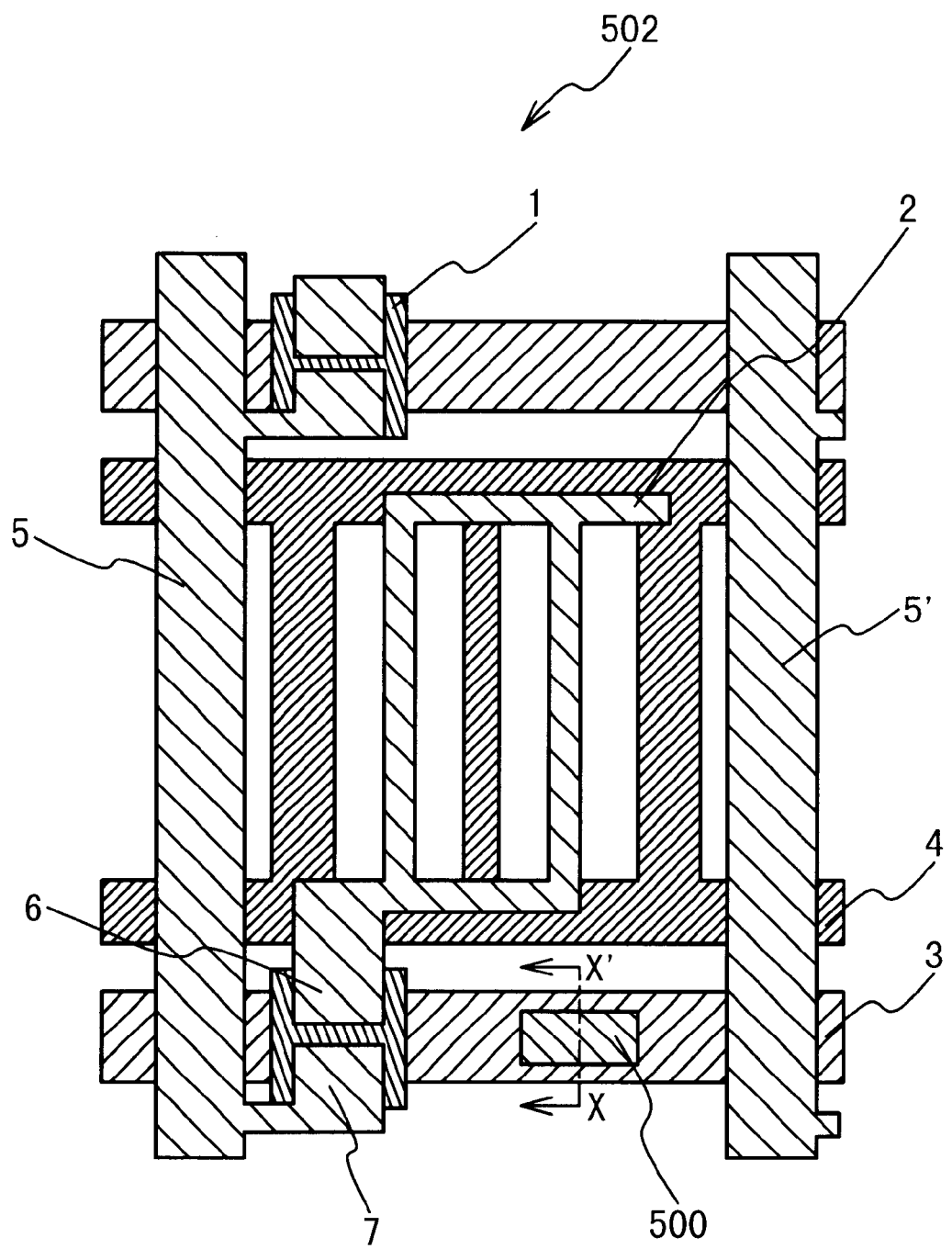
FIG. 3 is a plan view of a display cell of a second conventional example of the in-phase switching type liquid crystal display apparatus.
Figure 4:
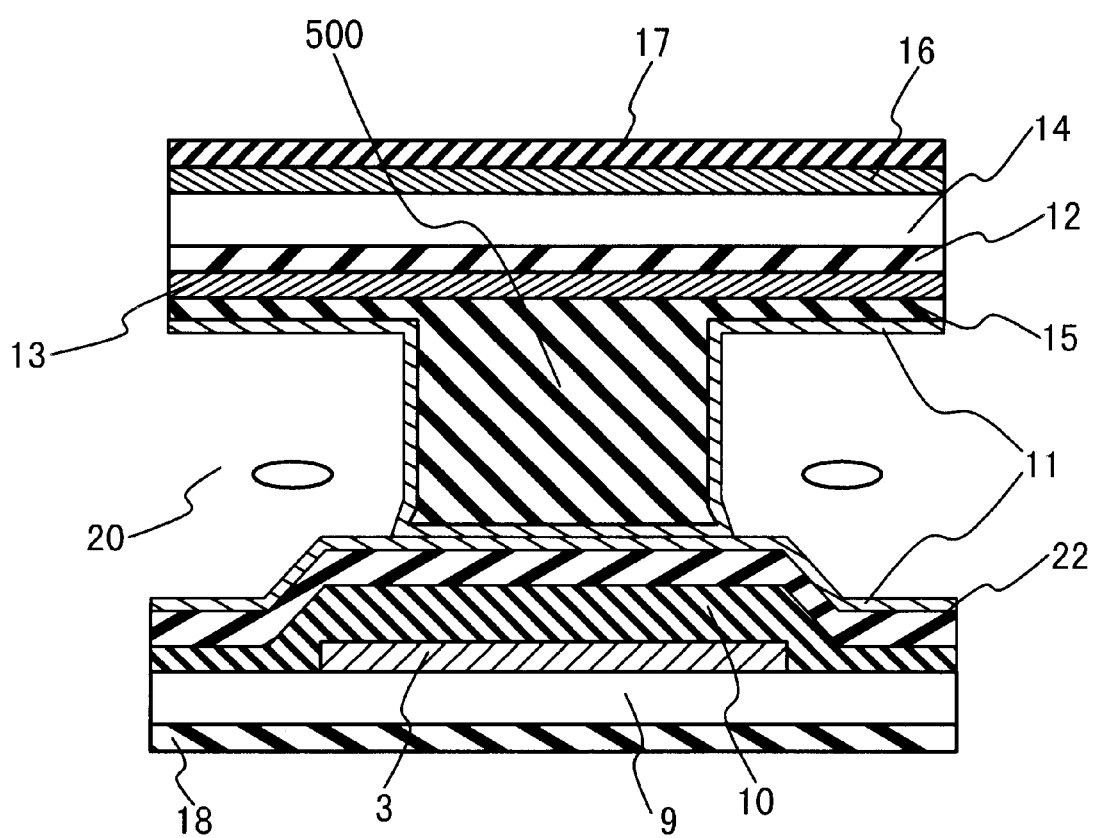
FIG. 4 is a cross sectional view of the display cell in a region of the supporting spacer along the line E–E' of FIG. 3.
Figure 5:
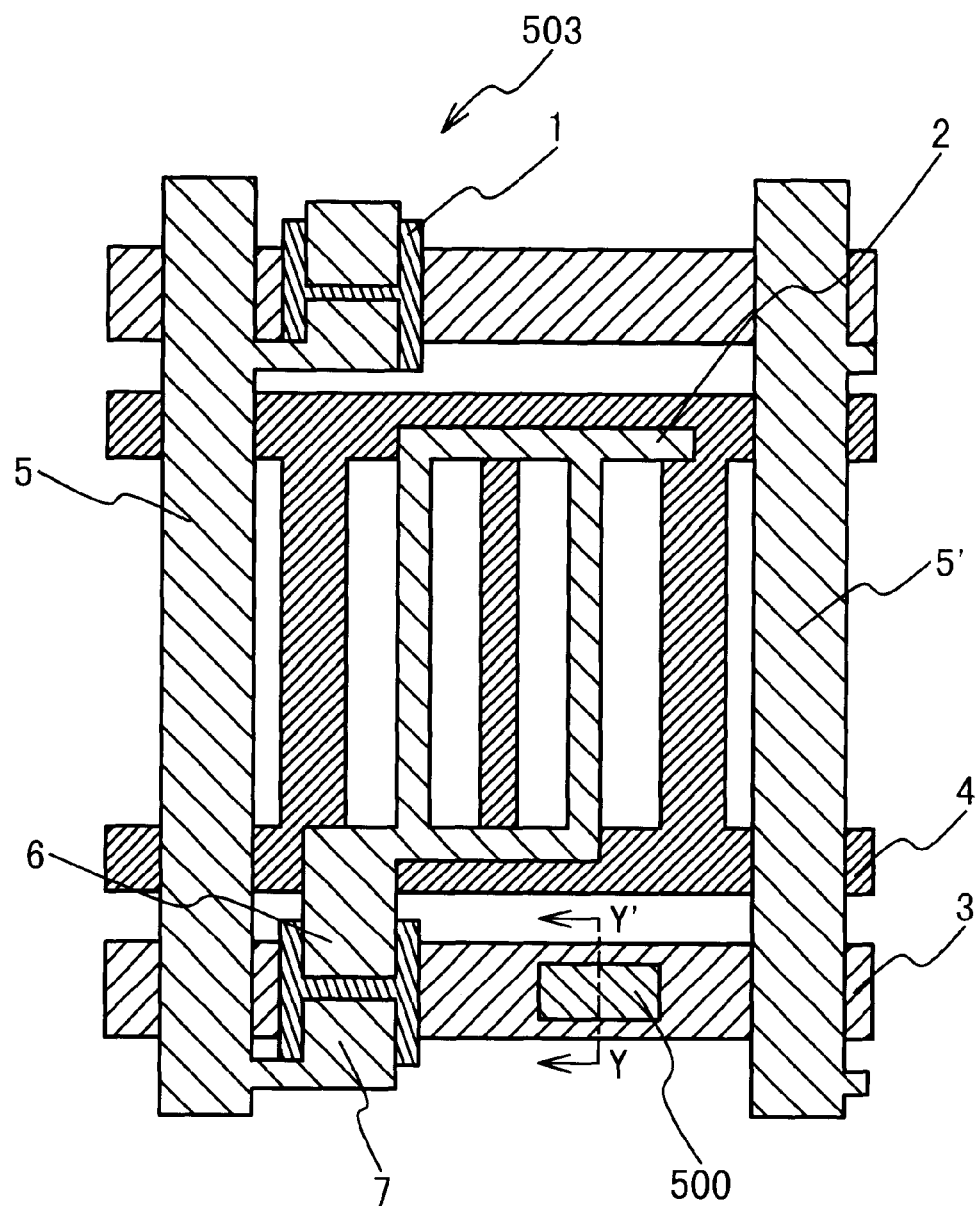
FIG. 5 is a plan view of a display cell in a third conventional example of an in-phase switching type liquid crystal display apparatus.
Figure 6:
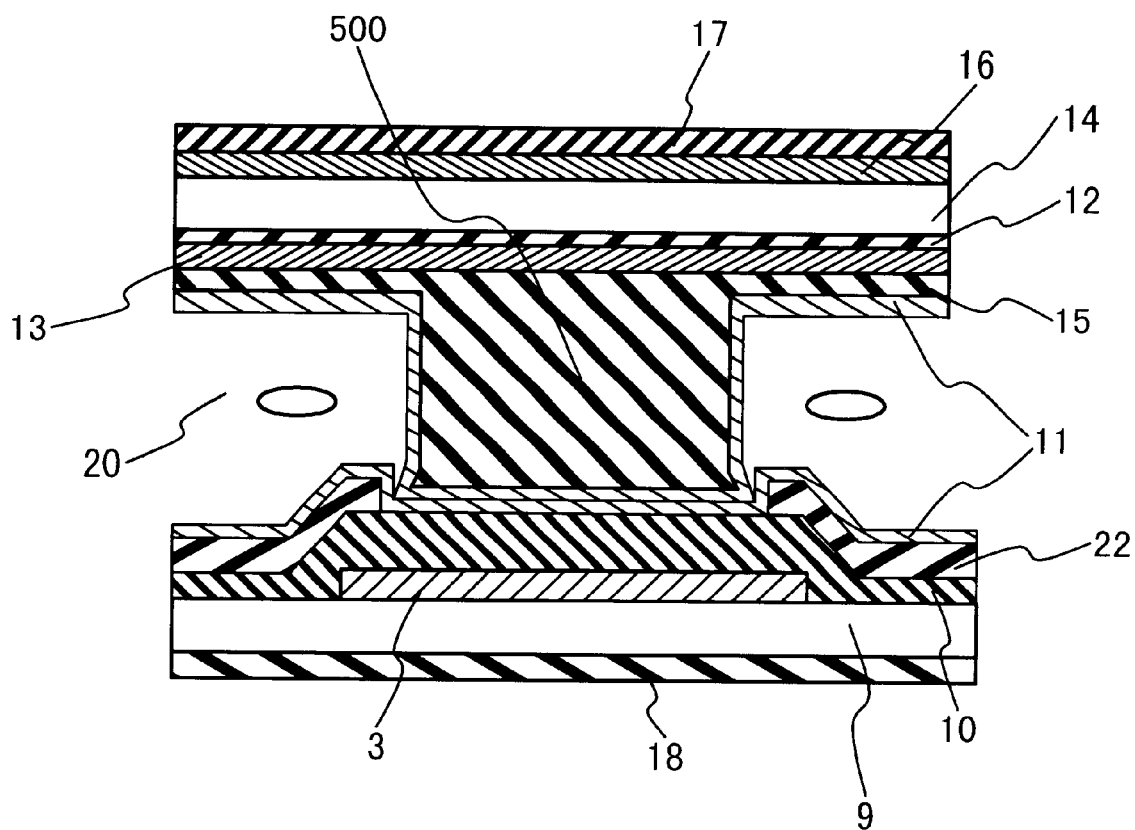
FIG. 6 is a cross sectional view of the display cell in a region of a supporting spacer along the line F–F' in FIG. 5.
Figure 7:
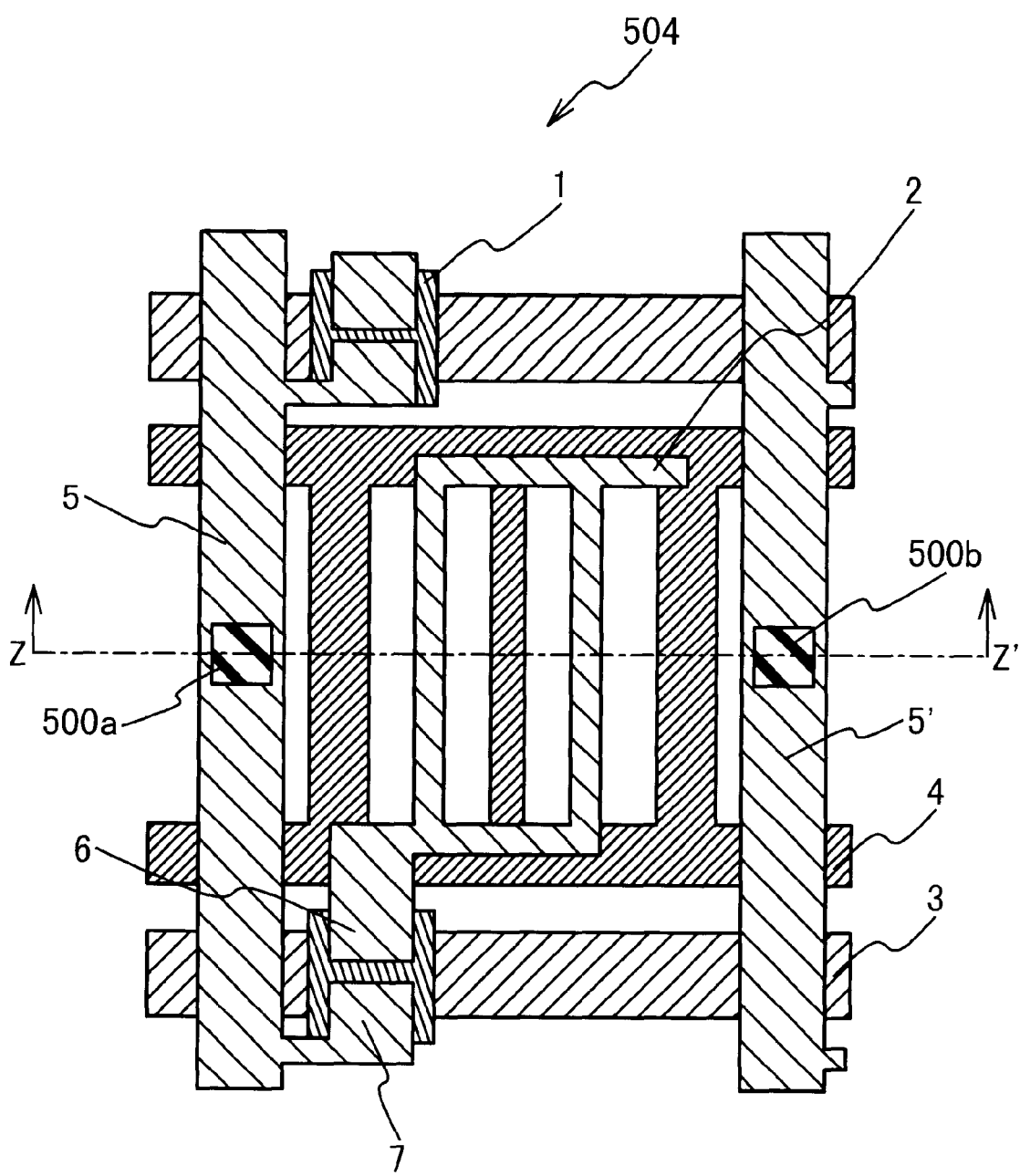
FIG. 7 shows a plan view of the display cell of a fourth conventional example of the in-phase switching type liquid crystal display apparatus.
Figure 8:
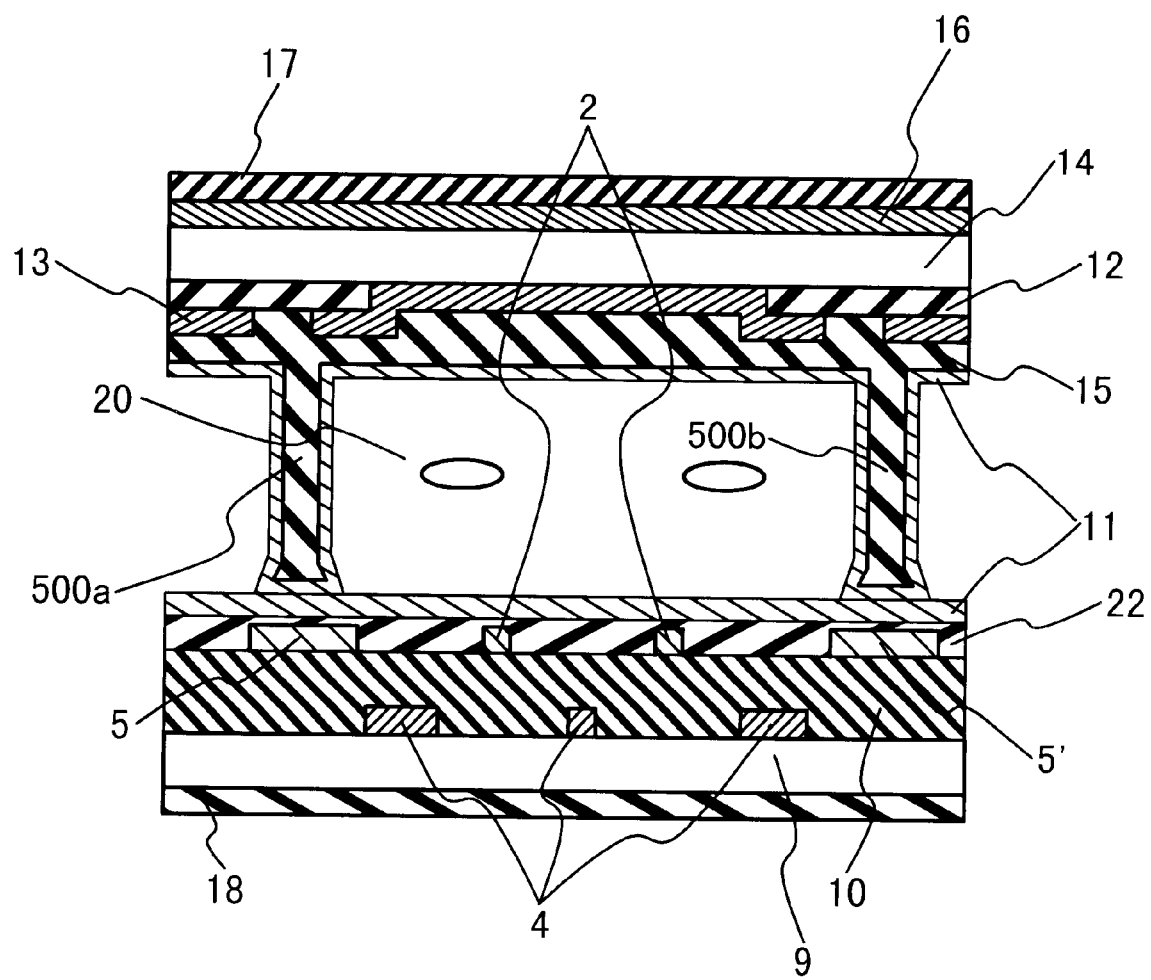
FIG. 8 is a cross sectional view of the display cell in the region of the supporting spacers along the line G–G' in FIG. 7.
Figure 9:
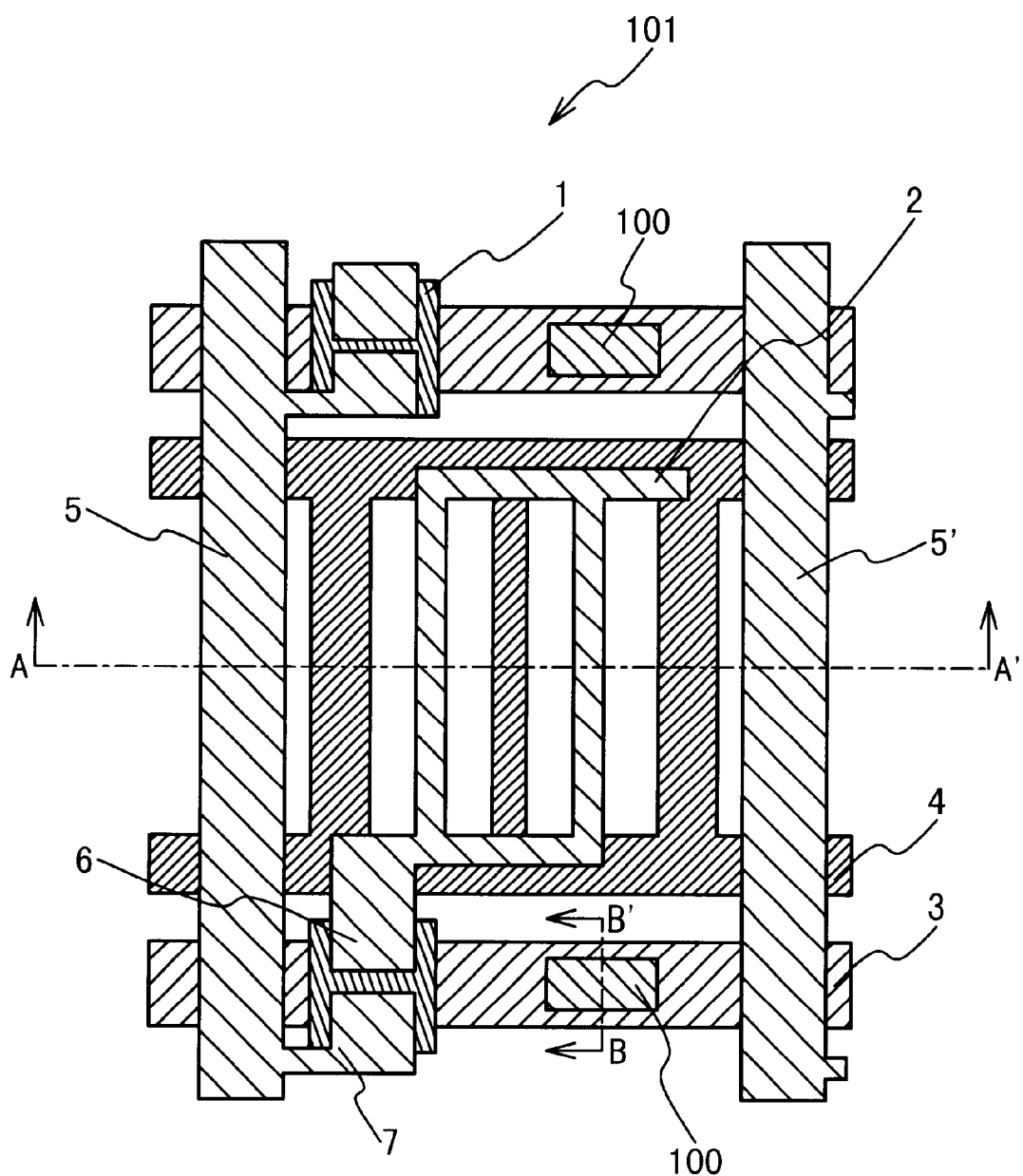
FIG. 9 is a plan view of a display cell of an in-phase switching type liquid crystal display apparatus according to a first embodiment of the present invention.

FIG. 9 is a plan view of a display cell of an in-phase switching type liquid crystal display apparatus according to a first embodiment of the present invention. The display cell 101 is composed of an amorphous silicon film 1, a pixel electrode 2, a gate electrode 3, a common electrode 4, a data line 5, a source electrode 6, a drain electrode 7, and a supporting spacer 100. The display cell is defined between adjacent gate electrodes 3 extending in a horizontal direction and between adjacent data lines 5 which are formed above the gate electrodes to extend in a vertical direction. A drive TFT transistor is formed in the lower left corner section of the display cell 101. The amorphous silicon film 1 as an insulating film is formed on the gate electrode, and the drain electrode 7 connected to the data line and a source electrode connected to the pixel electrode 2 are formed on the amorphous silicon film 1. The common electrode 4 has a ladder shape extending in the horizontal direction and is formed below the data lines 5. The pixel electrode 2 is formed to have a rectangular ring shape above the common electrode 4. The veridical sides are provided between the steps of the ladder of the common electrode 4. The supporting spacer 100 is provided on the gate electrode 3 in a right direction of the transistor.

Figure 10:
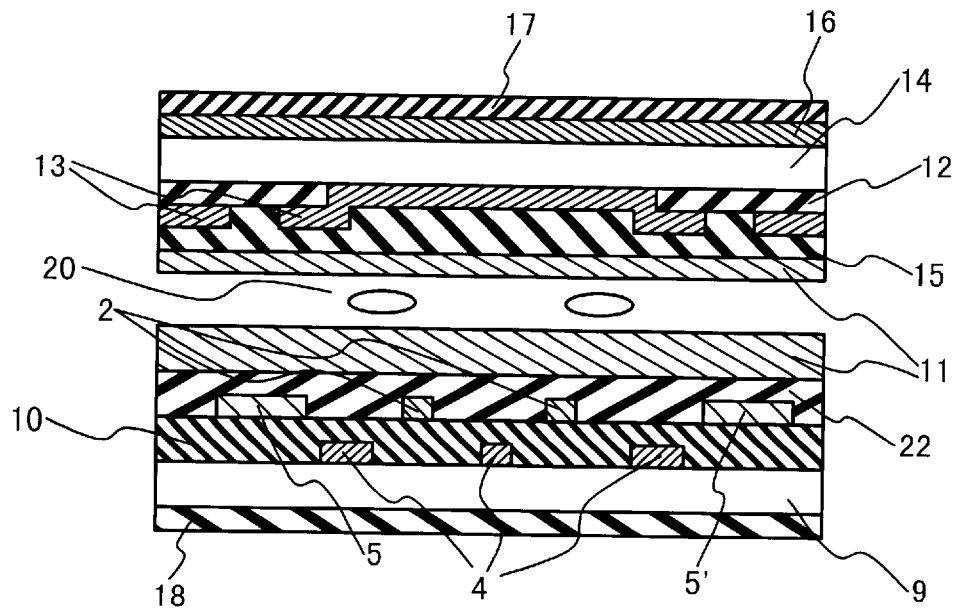
FIG. 10 is a cross sectional view of the display cell according to the first embodiment of the present invention along the line A–A' in FIG. 9.

FIG. 10 is a cross sectional view of the display cell 101 according to the first embodiment of the present invention along the line A–A' in FIG. 9. In FIG. 10, the upper substrate section located in the upper portion of the liquid crystal layer 20 is composed of an electric conducting layer 16 and a polarizing plate 17 formed on the front surface of a transparent substrate 14, and a black matrix layer 12, a color layer (color filter) 13, a flattening film 15, and an orientation film 11 formed on the back surface of the transparent substrate 14. The color layer 13 is partially formed on the back surface of the transparent substrate 14. The black matrix layer 12 is formed in a region other than a region where the color layer 13 is connected to the transparent substrate 14. The lower substrate section located in the liquid crystal layer 20 is composed of the common electrode 4, the gate electrode 3, an interlayer insulating film 10, the data lines 5 and 5' and a pixel electrode 2, a passivation film 22, and an orientation film 11 formed on the front surface of a transparent substrate 9, and a polarizing plate 18 formed on the back surface of the transparent substrate 9. The common electrode 4 and the gate electrode 3 are formed on the transparent substrate 9 and covered by the interlayer insulating film 10. The data lines 5 and 5' and the pixel electrode 2 are formed on the interlayer insulating film 10 and covered by the passivation film 22. A liquid crystal layer is provided between the upper substrate section and the lower substrate section. A liquid crystal molecule extends in the horizontal direction with no electric field.

Figure 11:
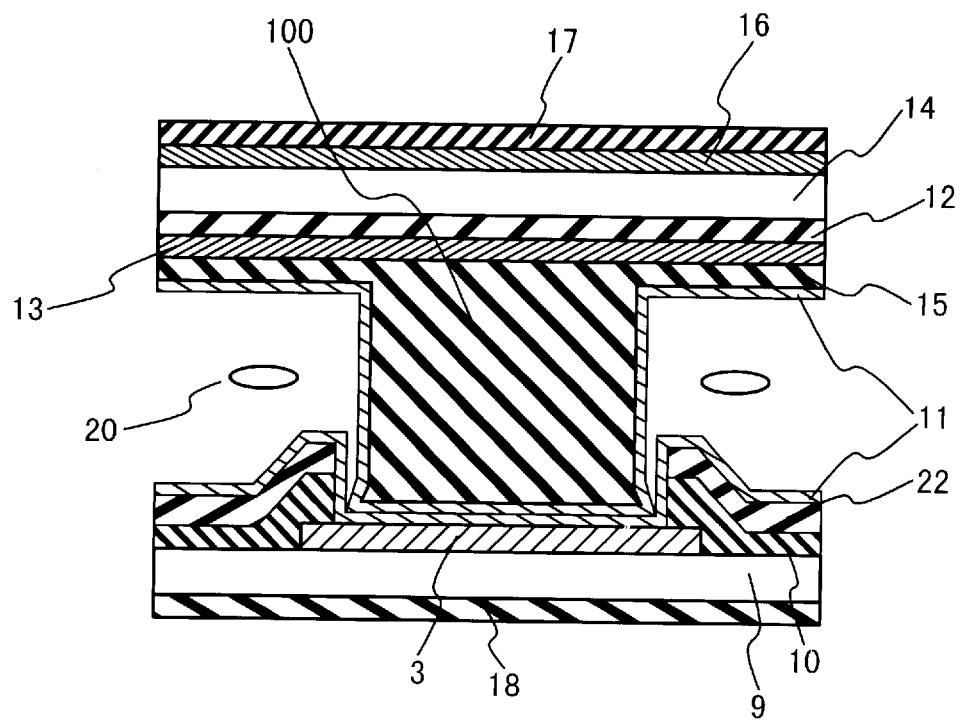
FIG. 11 is a cross sectional view of the supporting spacer of the display cell in the in-phase switching type liquid crystal display apparatus according to the first embodiment of the present invention along the line B–B' in FIG. 9.

FIG. 11 is a cross sectional view of the supporting spacer 100 of the display cell 101 in the in-phase switching type liquid crystal display apparatus according to the first embodiment of the present invention along the line B–B' in FIG. 9. In FIG. 11, the upper substrate section is composed of the black matrix layer 12, the color layer 13, the flattening film 15, and the orientation film 11 formed on the back surface of the transparent substrate 14. The flattening film 15 extends downward at a part of the gate electrode 3 to form the supporting spacer 100. The supporting spacer 100 may have a straight column shape but desirably has a horizontally extending bottom portion. The orientation film 11 fully covers the flattening film 15. The flattening film may be formed of inorganic material or organic material.

In FIG. 11, the lower substrate section is composed of the gate electrode 3, the interlayer insulating film 10, the passivation film 22 and the orientation film 11 formed on the front surface of the transparent substrate 9. The interlayer insulating film 10 and the passivation film 22 have an opening to form a concave section. Thus, a part of the surface of the gate electrode 3 is exposed. The orientation film 11 covers the upper surface of the passivation film 22 and the side walls of the concave section and an exposed surface of the gate electrode 3. The bottom portion of the supporting spacer 100 is loaded into the concave section. About 10% of the total height of the supporting spacer 100 is embedded in the concave section. Consequently, high resistance against the movement in the horizontal direction is obtained. When the liquid crystal layer is 4.5 $\mu$m thick, the interlayer insulating film as a gate insulating film and the passivation film are 0.7 $\mu$m, respectively, and the electrode is 0.2 $\mu$m high, if the display cell gap is formed by the supporting spacer not at all crushed, the supporting spacer height is set to about 5.0 $\mu$m. When the display cell gap is made narrower, the effect by the concave section becomes more remarkable.

Figure 12:
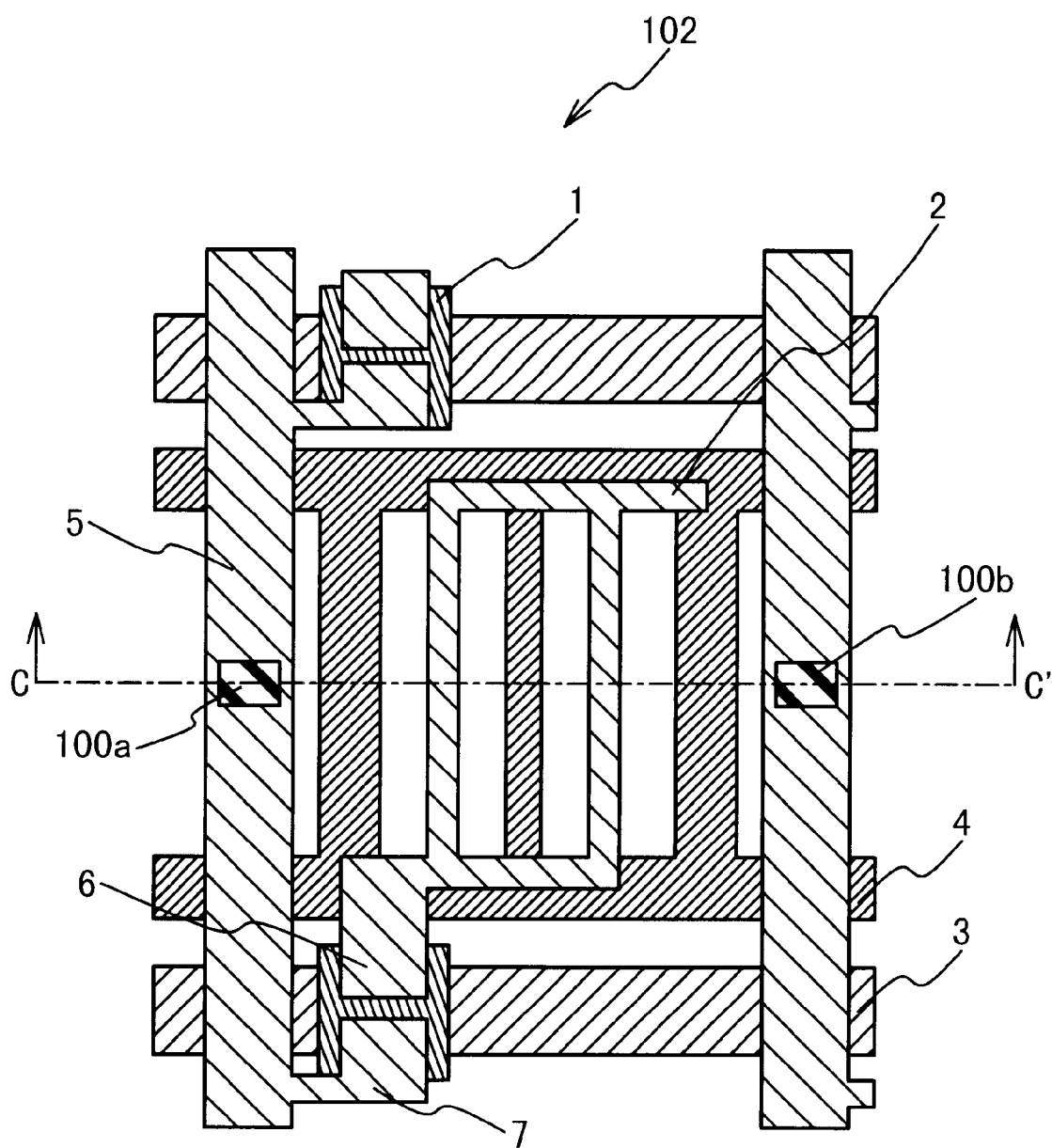
FIG. 12 is a plan view of the display cell of the in-phase switching type liquid crystal display apparatus according to a second embodiment of the present invention.

FIG. 12 is a plan view of the display cell of the in-phase switching type liquid crystal display apparatus according to the second embodiment of the present invention. The display cell 102 is similar to that in the first embodiment. That is, the display cell 102 is composed of an amorphous silicon 1, a pixel electrode 2, a gate electrode 3, a common electrode 4, a data line 5, a source electrode 6, a drain electrode 7, and supporting spacers 100a and 100b. The second embodiment is different from the first embodiment in that the supporting spacers 100a and 100b are provided on intermediate portions of the data lines 5 and 5'. The supporting spacer may be formed of inorganic material or organic material.

Figure 13:
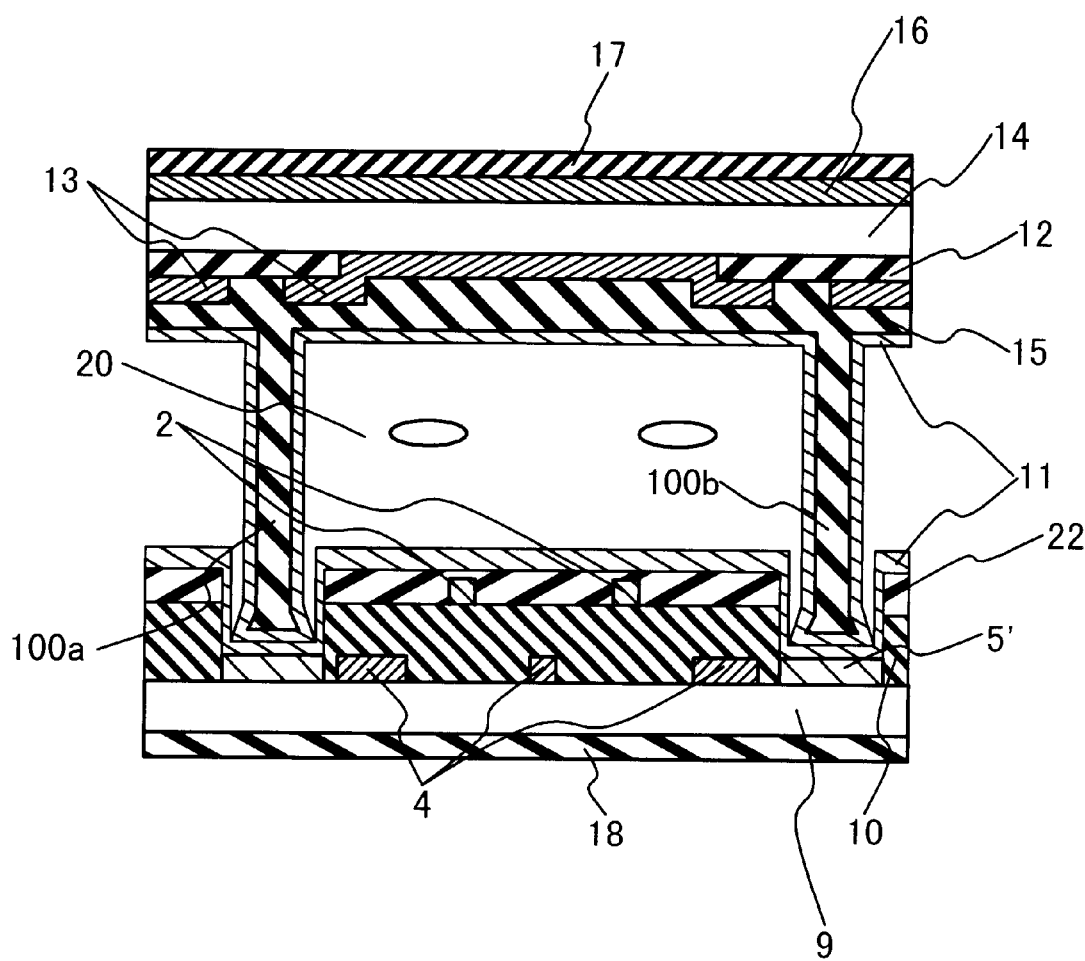
FIG. 13 is a cross sectional view of the supporting spacers of the in-phase switching type liquid crystal display apparatus in the second embodiment along the line C–C' in FIG. 12.

FIG. 13 is a cross sectional view of the supporting spacers 100a and 100b of the in-phase switching type liquid crystal display apparatus in the second embodiment along the line C–C' in FIG. 12. In FIG. 13, the upper substrate section of the display cell 102 is similar to that of the display cell in the first embodiment. That is, the upper substrate section is composed of a electric conducting layer 16 and a polarizing plate 17 formed on the front surface of a transparent substrate 14, a black matrix layer 12, a color layer (color filter) 13, a flattening film 15, and an orientation film 11 formed on the back surface of the transparent substrate 14. The flattening film 15 extends downward in the intermediate portion of the data lines 5 and 5' to form the supporting spacers 100a and 100b. It is desired that the supporting spacer has a horizontally extending bottom portion. The black matrix layer 12 is formed on the supporting spacers 100a and 100b via the color layer 13. In FIG. 13, the lower substrate section is similar to that in the first embodiment. That is, the lower substrate section is composed of the data lines 5 and 5', the common electrode 4, the interlayer insulating film 10, the pixel electrode 2, the passivation film 22, and the orientation film 11 formed on the front surface of the transparent substrate 9. The data lines 5 and 5' and the common electrode 4 are formed on the front surface of the transparent substrate 9. The transparent substrate 9, and a polarizing plate 18. The passivation film 22 and the interlayer insulating film 10 have openings to form concave sections corresponding to the supporting spacers 100a and 100b. Thus, portions of the data lines 5 and 5' are exposed. The orientation film 11 covers the surface of the passivation film 22 and the side walls of the openings and the exposed portions of the data lines 5 and 5'. The liquid crystal layer is formed in the display cell gap between the upper substrate section and the lower substrate section. About 10% of the total height of the supporting spacers 100a and 100b is embedded in the concave section. Consequently, high resistance against the move in the horizontal direction is obtained.

Figure 14A:
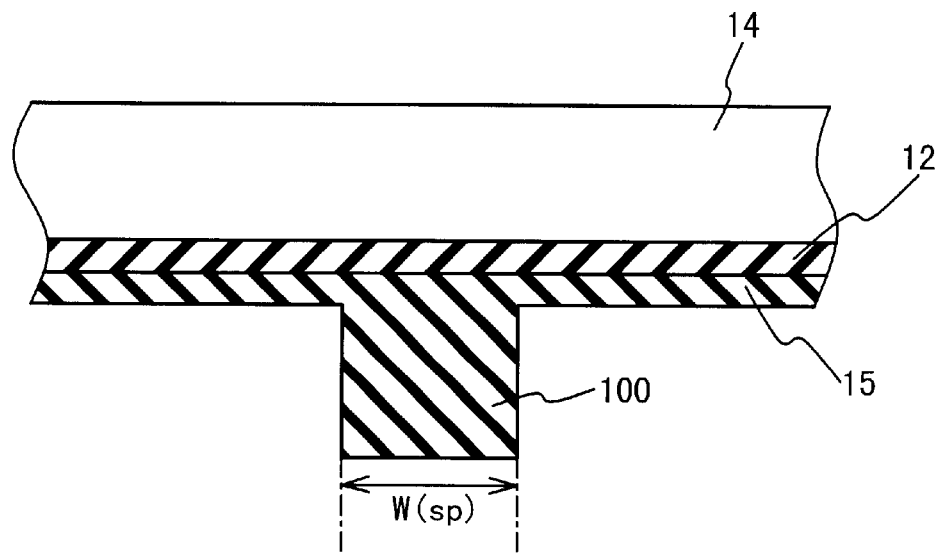
FIGS. 14A and 14B shows the relationship between the concave section and the supporting spacer in the present invention.
Figure 14B:
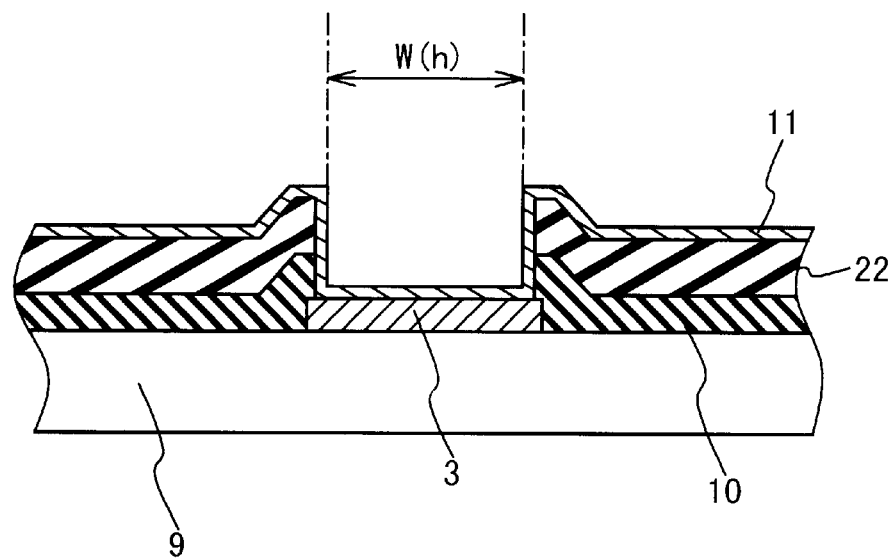

FIGS. 14A and 14B shows the relationship between the concave section and the supporting spacer in the present invention. In FIGS. 14A and 14B, the structure is simplified. The diameter W (h) of the concave section and the diameter W (sp) of the supporting spacer 100 satisfy the relation of (diameter W (sp)$\leq$diameter W (h)). Excessively great difference between these diameters easily causes displacement of the supporting spacer 100. As the value of the diameter W (sp) comes closer to the diameter W (h), the resistance of supporting spacer 100 against displacement increases.

Referring now to FIGS. 15A to 15E, the formation of the concave section of the present invention will be described below.

Figure 15A:
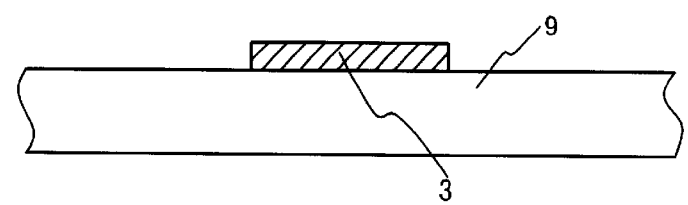
FIGS. 15A to 15E are cross sectional views showing the formation of a concave section of the present invention.
Figure 15B:
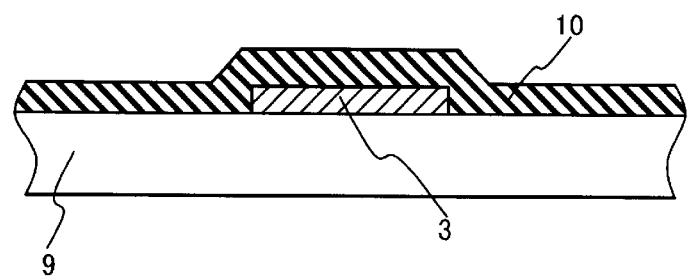
Figure 15C:
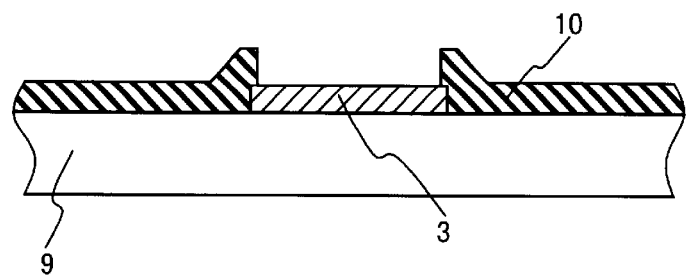
Figure 15D:
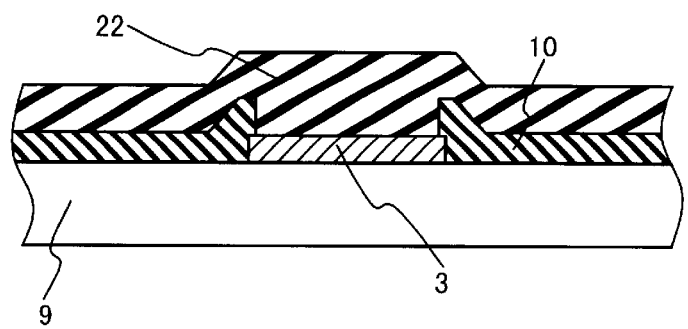
Figure 15E:
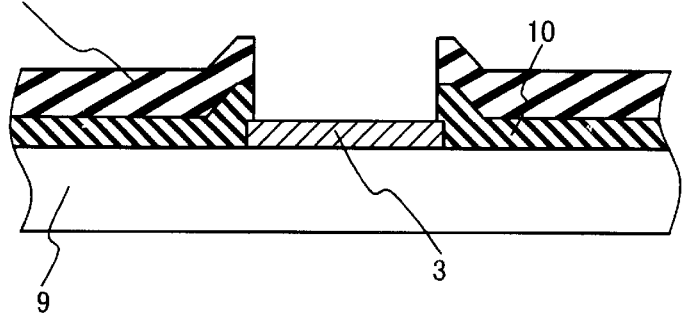

As shown in FIG. 15A, the gate electrode 3 is formed on the transparent substrate 9. Subsequently, as shown in FIG. 15B, the interlayer insulating film 10 is formed to cover the gate electrode 3 and the transparent substrate 9. Subsequently, as shown in FIG. 15C, the interlayer insulating film 10 is removed from the upper surface of the gate electrode. Subsequently, as shown in FIG. 15D, the passivation film 22 is formed to cover the interlayer insulating film 10 and the exposed surface of the gate electrode 3. Finally, the passivation film 22 on the gate electrode 3 is removed, and the concave section is formed. The supporting spacer is loaded into the concave section.

FIGS. 16A to 16E are cross sectional views showing the formation of the concave section of the present invention.

Figure 16A:
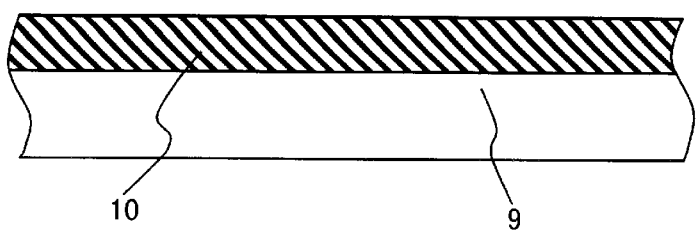
FIGS. 16A to 16E are cross sectional views showing the formation of the concave section of the present invention.
Figure 16B:
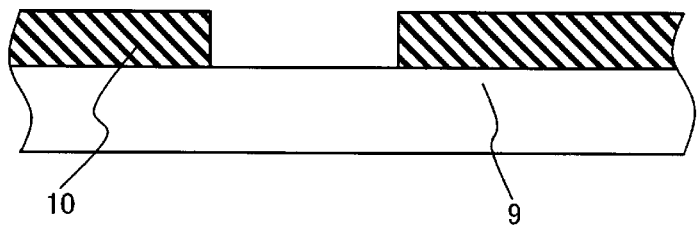
Figure 16C:
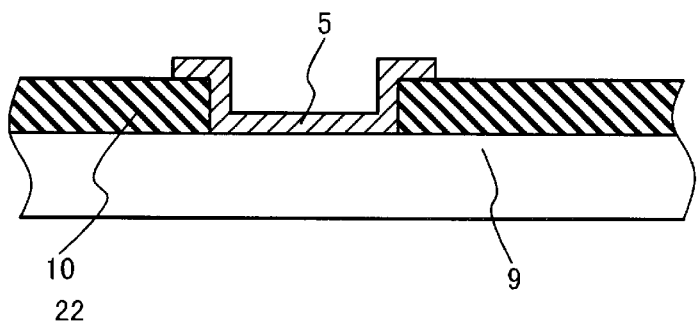
Figure 16D:
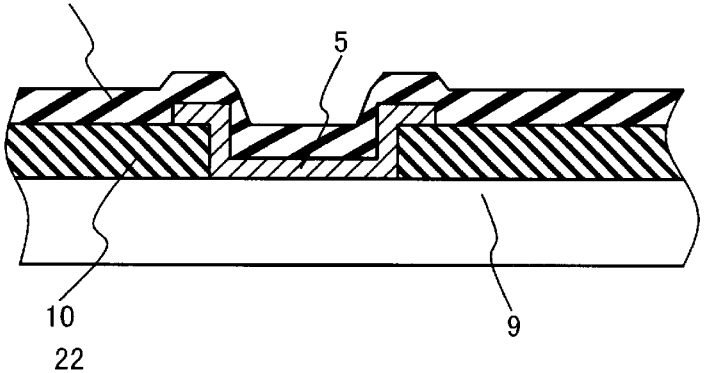
Figure 16E:
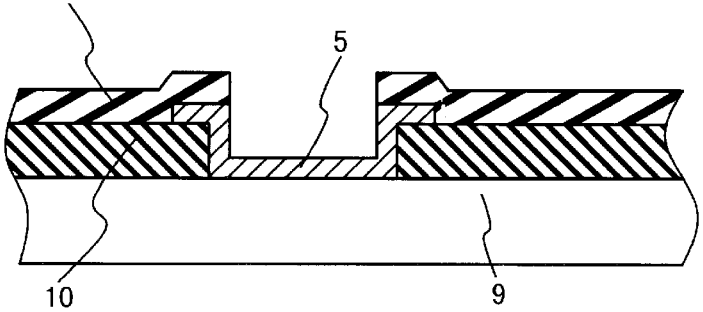

As shown in FIG. 16A, the interlayer insulating film 10 is formed on the transparent substrate 9. Then, as shown in FIG. 16B, a part of the interlayer insulating film 10 is removed to expose of a part of the surface of the transparent substrate 9. Thus, a concave section is formed. Subsequently, as shown in FIG. 16C, the data line 5 is formed to cover the side walls and bottom surface of the in the concave section. Then, the data line 5 is patterned. Subsequently, as shown in FIG. 16D, the passivation film 22 is formed to cover the interlayer insulating film 10 and the data line 5. Then, as shown in FIG. 16E, the passivation film 22 on the side wall and bottom surface of the data line 3 is removed and the concave section is formed. The supporting spacer is loaded into the concave section.

Figure 17:
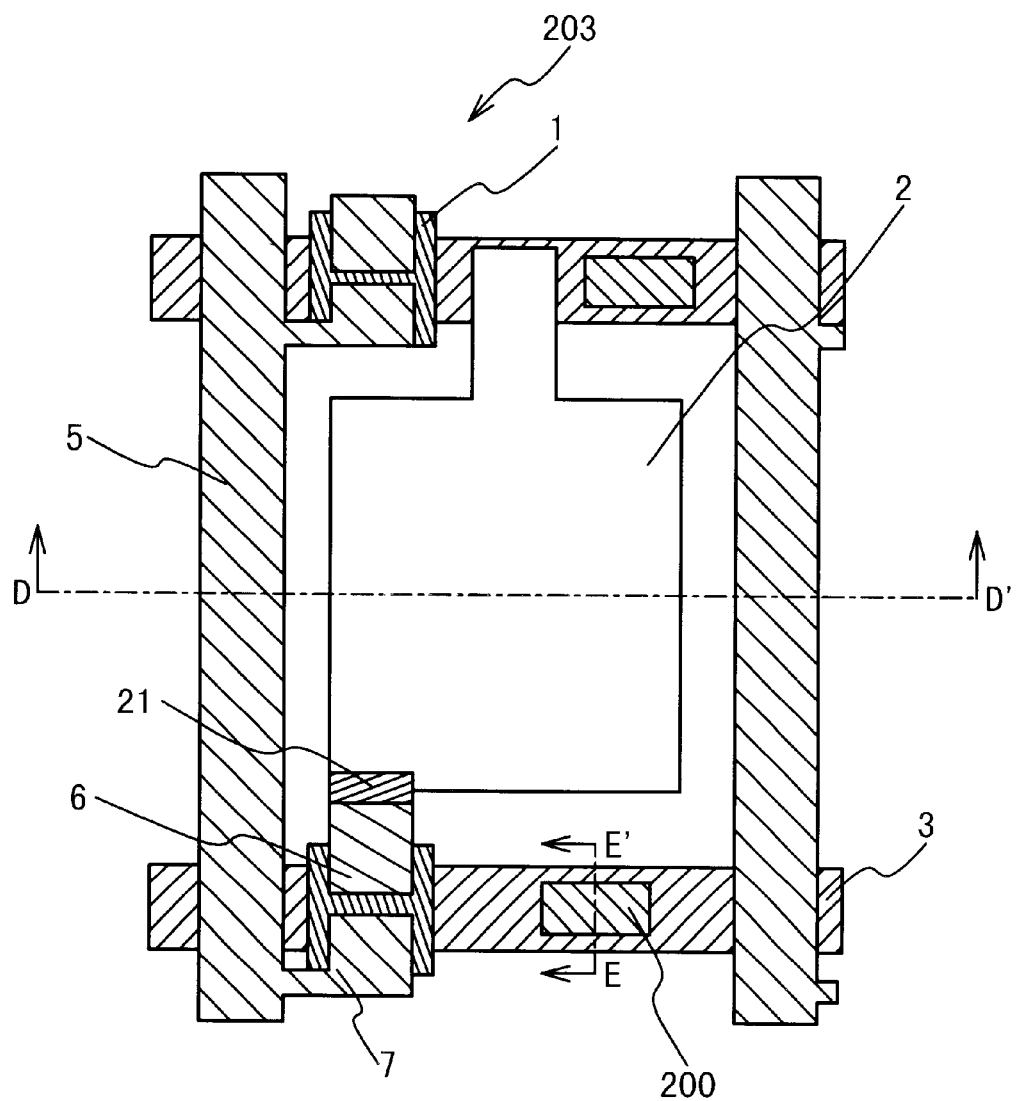
FIG. 17 is a plan view of the display cell of a twisted nematic type liquid crystal display apparatus according to a third embodiment of the present invention.

FIG. 17 is a plan view of the display cell of the twisted nematic type liquid crystal display apparatus according to the third embodiment of the present invention. The display cell 103 is composed of an amorphous silicon film 1, a pixel electrode 2, gate electrodes 3, data lines 5, a source electrode 6, a drain electrode 7, a supporting spacer 200, and a contact hole 21. The display cell 103 is defined between adjacent gate electrodes 3 extending in a horizontal direction and between adjacent data lines 5 which are formed above the gate electrodes to extend in a vertical direction. A drive TFT transistor is formed in the lower left corner section of the display cell 103. The amorphous silicon film 1 as an insulating film is formed on the gate electrode, and the drain electrode 7 connected to the data line and a source electrode 6 connected to the pixel electrode 2 are formed on the amorphous silicon film 1. The pixel electrode 2 is formed to have a rectangular shape and an extending portion toward the gate electrode 3. The pixel electrode 2 is connected to the source electrode of the transistor via the contact hole 21. The supporting spacer 200 is provided on the gate electrode 3 in a right direction of the transistor.

Figure 18:
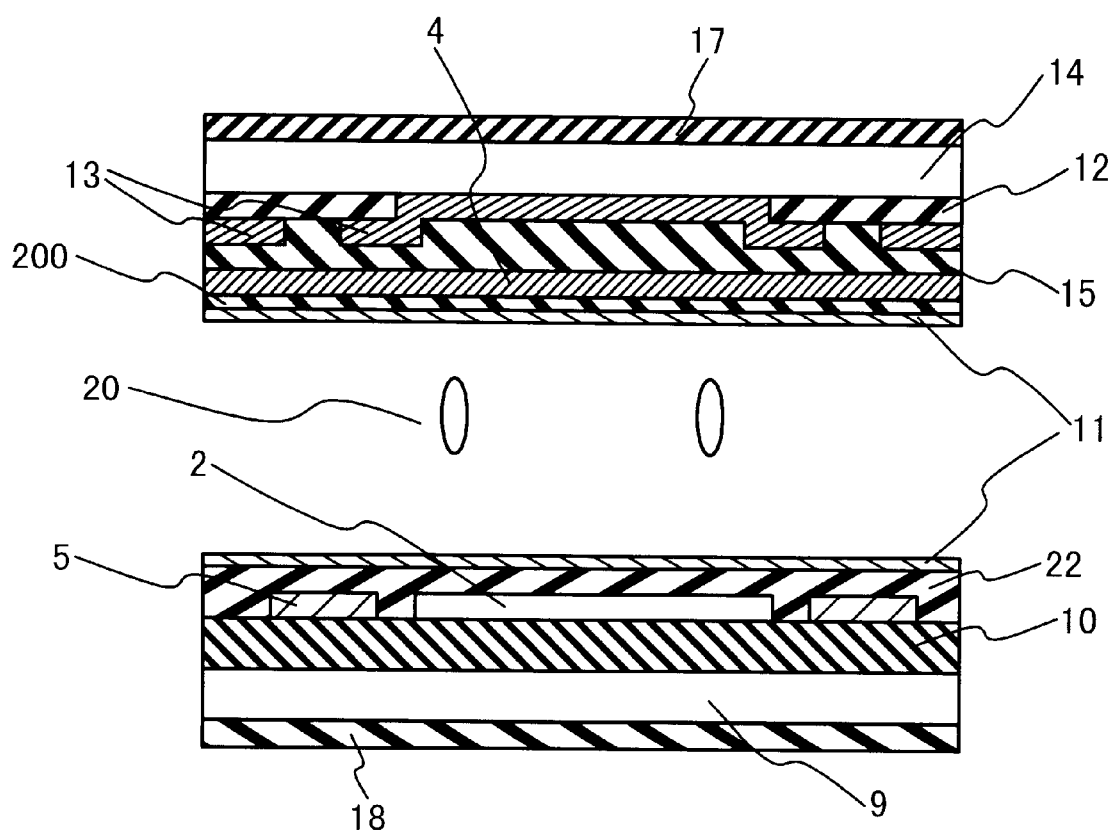
FIG. 18 is a cross sectional view of the display cell 103 according to the third embodiment of the present invention along the line D–D' in FIG. 17.

FIG. 18 is a cross sectional view of the display cell 103 according to the third embodiment of the present invention along the line D–D' in FIG. 17. In FIG. 18, the upper substrate section located at the upper section of the liquid crystal layer 20 is composed of a polarizing plate 17 formed on the front surface of a transparent substrate 14, and a transparent substrate 14, a black matrix layer 12, a color layer (color filter) 13, a flattening film 15, common electrode 4, supporting spacer 200, and orientation film 11 formed on the back surface of the transparent substrate 14. The color layer 13 is partially formed on the back surface of the transparent substrate 14. The black matrix layer 12 is formed in a region other than a region where the color layer 13 is connected to the transparent substrate 14. The common electrode extends throughout the display cell 103. The lower substrate section located at the lower section of the liquid crystal layer 20 is composed of an interlayer insulating film 10, data lines 5 and 5', a pixel electrode 2, passivation film 22, and orientation film 11 formed on the front surface of a transparent substrate 9, and a polarizing plate 18 formed on the back surface of the transparent substrate 9. The data lines 5 and 5' and the pixel electrode 2 are formed on the interlayer insulating film 10 and covered by the passivation film 22. A liquid crystal layer 20 is provided between the upper substrate section and the lower substrate section, and a liquid crystal molecule extends in the vertical direction with no electric field.

Figure 19:
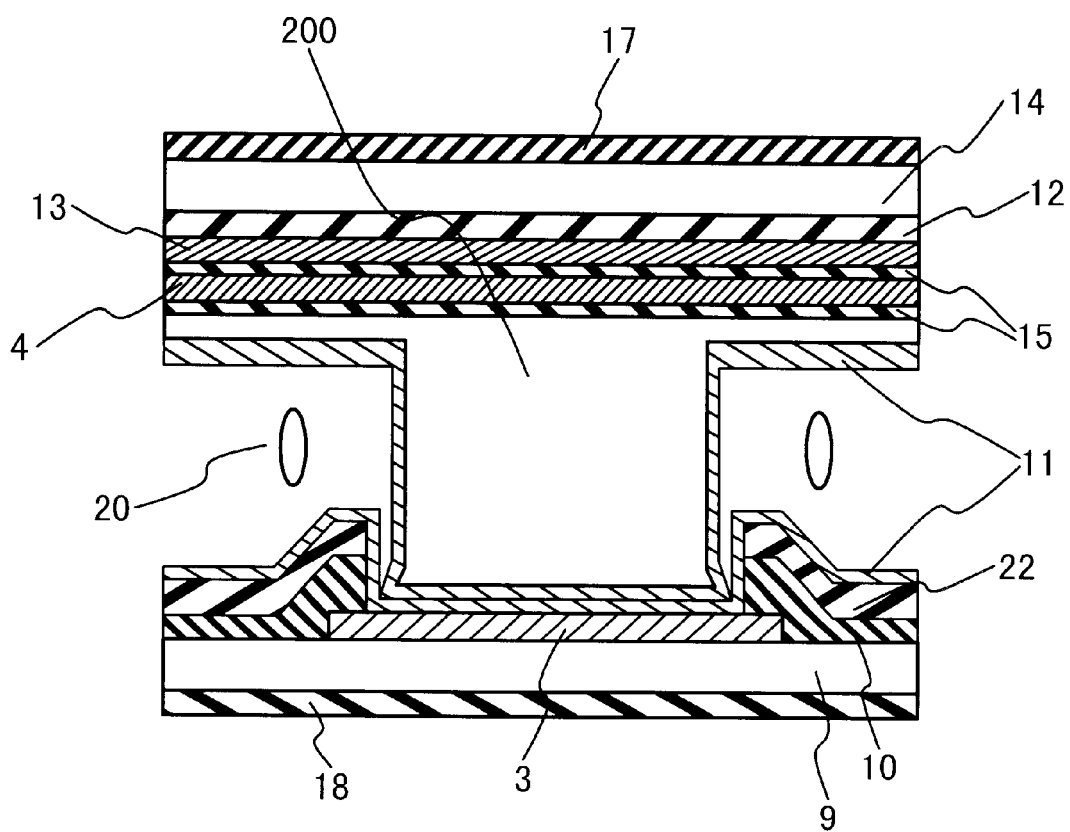
FIG. 19 is a cross sectional view of the supporting spacer of the display cell 103 according to the third embodiment of the present invention along the line E–E' in FIG. 17.

FIG. 19 is a cross sectional view of the supporting spacer 200 of the display cell 103 according to the third embodiment of the present invention along the line E–E' in FIG. 17. In FIG. 19, the upper substrate section is composed of the polarizing plate 17, the transparent substrate 14, the black matrix layer 12, the color layer (color filter) 13, the flattening film 15, the common electrode 4, the supporting spacer 200, and the orientation film 11 from the top layer. In this example, the supporting spacer 200 is formed on the flattening film 15 in this region. The supporting spacer 200 may be formed of organic material or inorganic material. Also, the supporting spacer 200 may be formed as a unit with the flattening film 15. Moreover, the supporting spacer 200 desirably has a horizontally extending bottom portion. The orientation film 11 fully covers the flattening film 15.

In FIG. 19, the lower substrate section is composed of the orientation film 11, a passivation film 22, an interlayer insulating film 10, the gate electrode 3, the transparent substrate 9, and the polarizing plate 18 from the top. The passivation film 22 and the interlayer insulating film 10 have an opening to form a concave section. Thus, a part of the surface of the gate electrode 3 is exposed. The orientation film 11 covers the upper surface of the passivation film 22 and the side walls of the concave section and an exposed surface of the gate electrode 3. The supporting spacer 100 is loaded into the concave section. The supporting spacer 100 is loaded on the gate electrode 3. The liquid crystal layer 20 is arranged in the display cell gap formed by the supporting spacer 100. About 10% of the total height of the supporting spacer 100 is embedded in the concave section. Consequently, high resistance against the movement in the horizontal direction is obtained.

Figure 20:
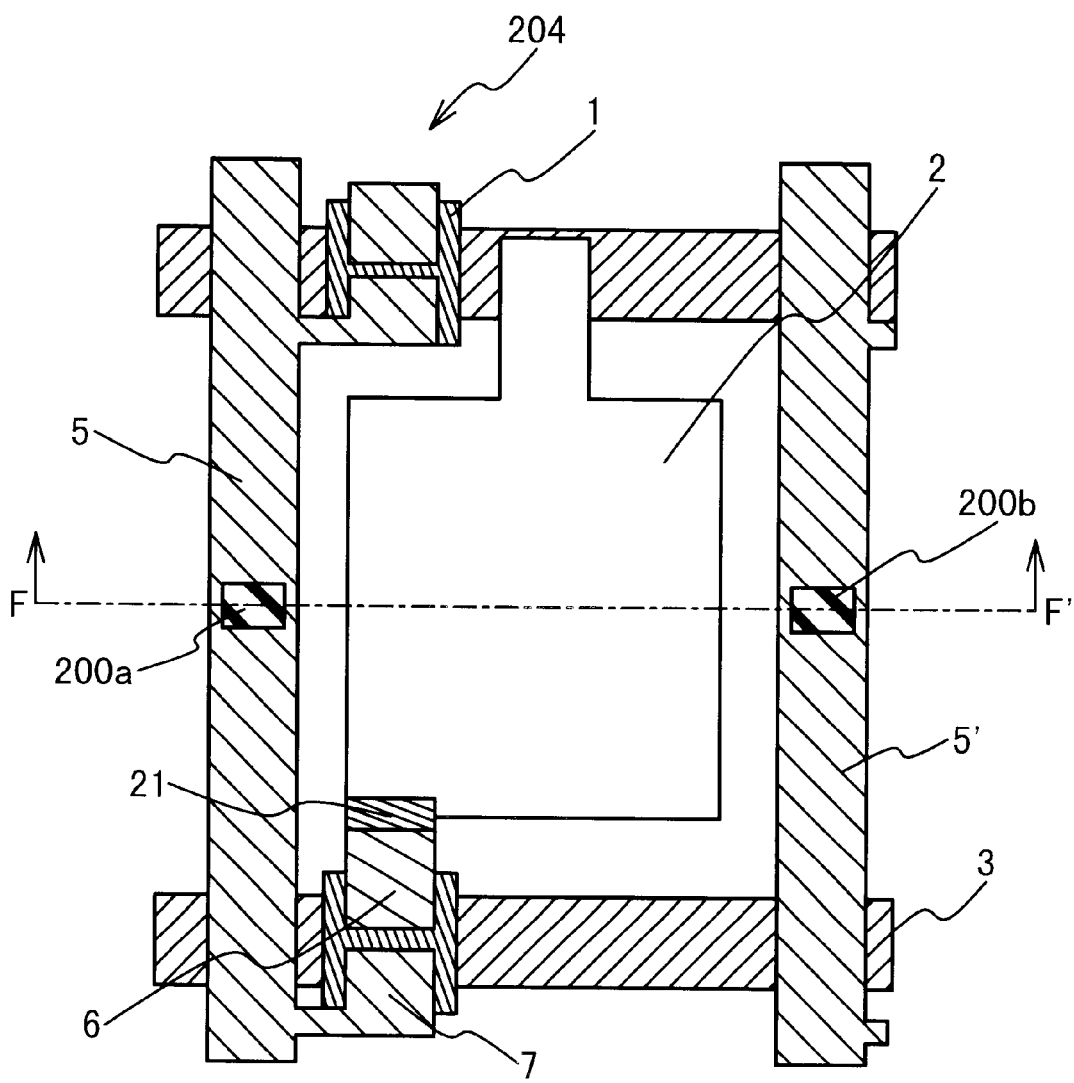
FIG. 20 is a plan view of the display cell of the twisted nematic type liquid crystal display apparatus according to a fourth embodiment of the present invention.

FIG. 20 is a plan view of the display cell of the twisted nematic type liquid crystal display apparatus according to the fourth embodiment of the present invention. The display cell 104 is similar to that in the third embodiment. That is, the display cell 104 is composed of an amorphous silicon 1, a pixel electrode 2, gate electrodes 3, data lined 5 and 5', a source electrode 6, a drain electrode 7, supporting spacers 200a and 200b, and a contact hole 21. The display cell 104 is defined between adjacent gate electrodes 3 extending in a horizontal direction and between adjacent data lines 5 and 5' which are formed above the gate electrodes to extend in a vertical direction. A drive TFT transistor is formed in the lower left corner section of the display cell 104. The amorphous silicon film 1 as an insulating film is formed on the gate electrode, and the drain electrode 7 connected to the data line and a source electrode connected to the pixel electrode 2 are formed on the amorphous silicon film 1. The pixel electrode 2 is formed to have a rectangular shape and an extending portion toward the gate electrode 3. The pixel electrode 2 is connected to the source electrode of the transistor via the contact hole 21. The supporting spacers 200a and 200b are provided on intermediate portions of the data lines 5 and 5'.

Figure 21:
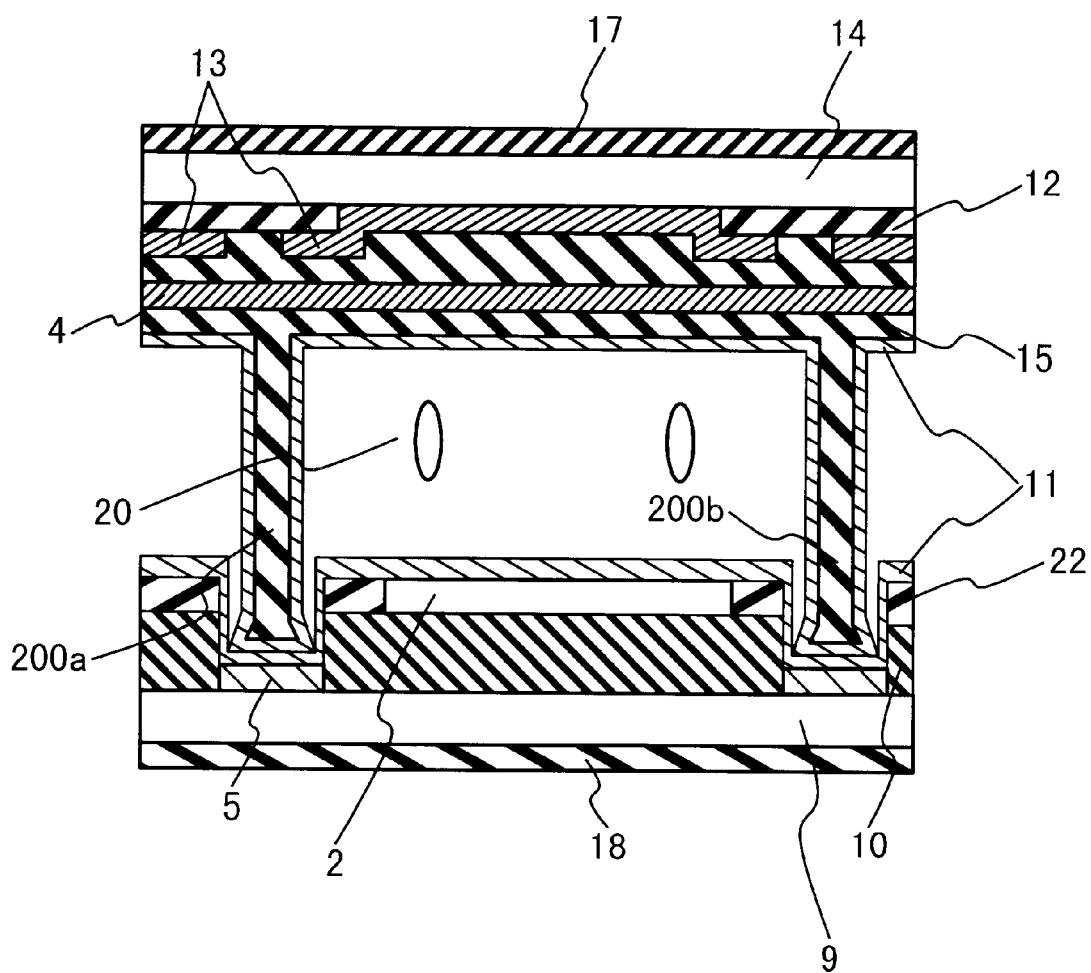
FIG. 21 shows a cross sectional view of supporting spacers along the line F–F' in FIG. 20.

FIG. 21 shows a cross sectional view of supporting spacers 200a and 200b along the line F–F' in FIG. 20. In FIG. 21, the upper substrate section is similar to that in the third embodiment. That is, the upper substrate section is composed of a polarizing plate 17, a transparent substrate 14, a black matrix layer 12, a color layer (color filter) 13, a flattening film 15, a common electrode 4, the supporting spacers 100a and 100b, and an orientation film 11 from the top. The color layer 13 is partially formed on the back surface of the transparent substrate 14. The black matrix layer 12 is formed in a region other than a region where the color layer 13 is connected to the transparent substrate 14. The common electrode extends throughout the display cell 103. Also, in FIG. 21, the lower substrate section is similar to that in the third embodiment. That is, the lower substrate section is composed of an orientation film 11, the pixel electrode 2, a passivation film 22, the data lines 5 and 5', the pixel electrode 2, an interlayer insulating film 10, a transparent substrate 9, and a polarizing plate 18. The data lines 5 and 5' are formed on the transparent substrate 9 and the pixel electrode 2 is formed on the interlayer insulating film 10 and covered by the passivation film 22. The passivation film 22 and the interlayer insulating film 10 are removed from the upper portions of the data lines 5 and 5' to form concave sections corresponding to the supporting spacers 200a and 200b. The orientation film 11 covers the passivation film 22 and inner surfaces of the concave sections. The liquid crystal layer 20 is arranged in the display cell gap between the upper substrate section and the lower substrate section, and a liquid crystal molecule extends in the vertical direction with no electric field. The tip portions of the supporting spacers 200a and 200b are loaded into the concave sections. About 10% of the total height of the supporting spacers 100a and 100b is embedded in the concave section. Consequently, high resistance against the move in the horizontal direction is obtained.

Figure 22:
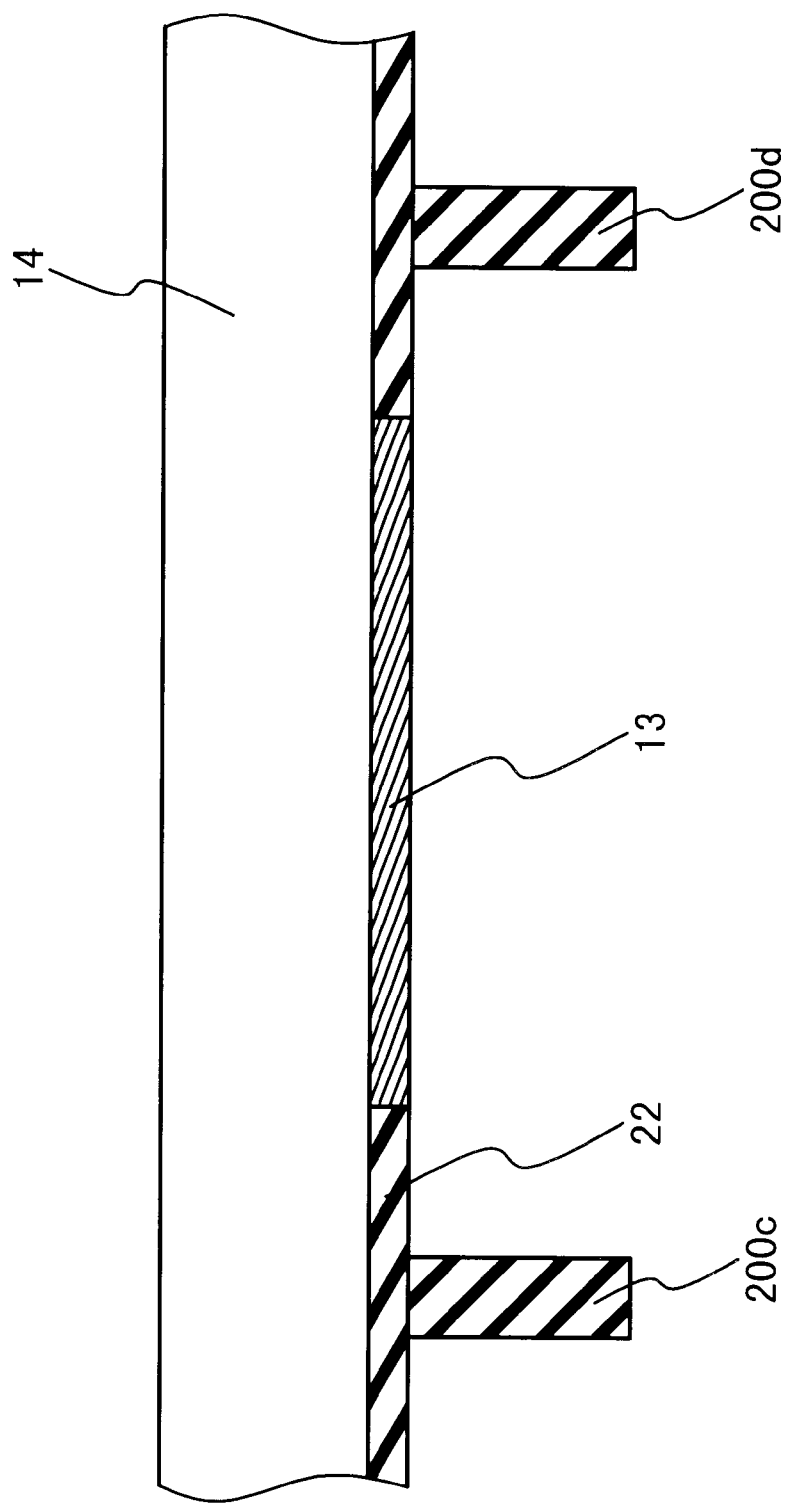
FIG. 22 shows the concept of the supporting spacers of the present invention.

The supporting spacers of the present invention may be formed independently. FIG. 22 shows the concept of the supporting spacers of the present invention. The figure shows the structure in which the supporting spacers are utilized. The supporting spacers 200c and 200d are located in the vicinity of the light shielding layer (black matrix layer) 12. The color filter (color layer) 13 is disposed on the lateral side of the light shielding layer 12. The transparent substrate 14 is provided on the color filter 13.

FIG. 23 is a cross sectional view of the supporting spacer according to the fifth embodiment of the present invention. The display cell is composed of a polarizing plate 17, an electric conducting layer 16, a transparent substrate 14, a color filter 13, a light shielding layer 12, supporting spacers 200c and 200d, a passivation film 22, a pixel electrode 2, an interlayer insulating film 10, gate electrodes 3, a common electrode 4, a transparent substrate 9, and a polarizing plate 18. The passivation film 22 and the interlayer insulating film 10 have an opening to form concave sections corresponding to the supporting spacers 200c and 200d. The supporting spacers 200c and 200d are produced separately from light shielding layer 12 (and a flattening film 15 in the other embodiments) and adhered to the light shielding layer 12 and the gate electrodes 3. When the adhesion to the light shielding layer 12 is compared to the adhesion to the gate electrode 3, the adhesion to the light shielding layer 12 is higher. However, by the operation of the concave sections formed on the gate electrodes 3, the resistance against the displacement of supporting spacers 200c and 200d is high on the side of the gate electrode 3. Consequently, the displacement of the supporting spacers 200c and 200d can be avoided on the side of the gate electrodes 3 with comparatively low adhesion.

The process of forming the concave section in the present invention will be described below with reference to FIGS. 24A to 24L. The figure shows changes of the cross section along the line B–B' in FIG. 9.

Figure 24A:
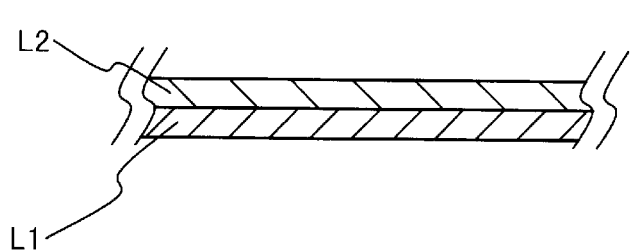
FIG. 24A to 24L are cross sectional views showing the process of forming the concave section in the present invention.
Figure 24B:
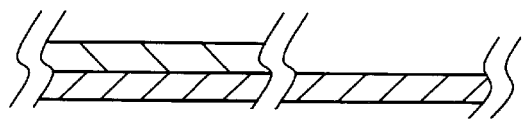
Figure 24C:
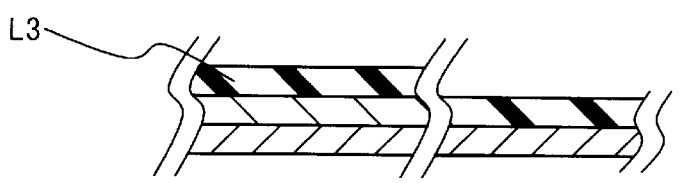
Figure 24D:
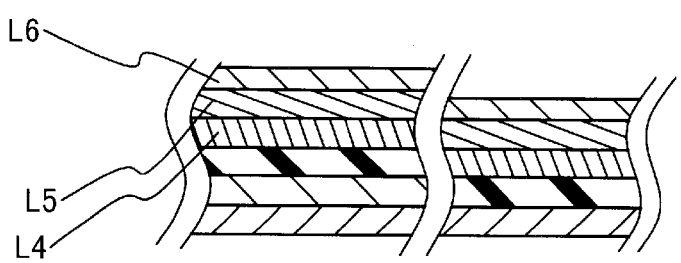
Figure 24E:
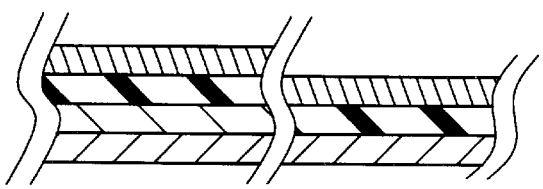

As shown in FIG. 24A, the gate electrode layer (L2) 3 of chromium (Cr) is formed on the transparent substrate (L1) 9. In this process, a cleaning step, and a chromium sputtering step are carried out. Then, as shown in FIG. 24B, a pattern of the gate electrode is determined. In this process, a cleaning step, a resist application step, a light exposure step, a development step, a chromium etching step, and a resist removal step are carried out. Then, in FIG. 24C, the interlayer insulating film (or a gate insulating film) (L3) 10 of $SiO_2$ or SiNx is formed on the gate electrode. Then, as shown in FIG. 24D, the lower layer (L4) of SiNx of the passivation film 22 and the silicon layer (L5, L6) of a-Si and $n^+$-aSi are formed on the interlayer insulating film 10. Then, as shown in FIG. 24E, the silicon layers (L5, L6) of a-Si, $n^+$-aSi are removed from the top of the gate electrode 3. In the process shown in FIGS. 24C to 24E, a cleaning step, a $SiO_2$ and SiNx film formation step, a cleaning step, a three-layer continuous P-CVD step, a cleaning step, a resist application step, an exposure step, a development step, an island-dry etching step, and a resist removal step are carried out.

Figure 24F:
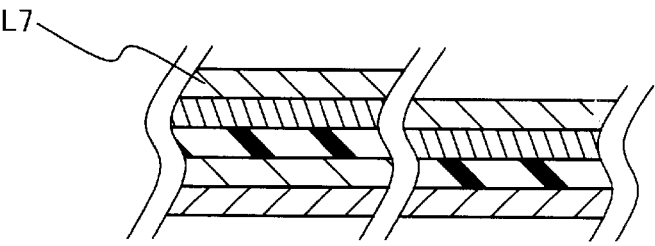
Figure 24G:
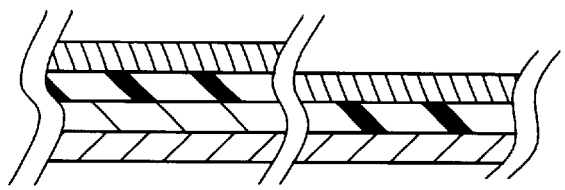
Figure 24H:
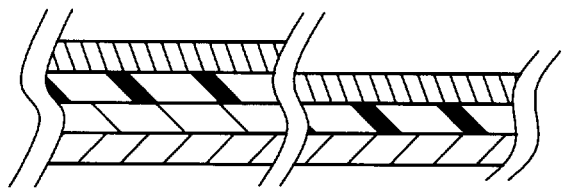

Next, as shown in FIG. 24F, a chromium layer is formed. Then, as shown in FIG. 24G, the chromium layer is removed. Subsequently, in the process shown in FIG. 24H, channel dry etching is carried out. In the process shown in FIGS. 24F to 24H, a cleaning step, a chromium sputtering step, a cleaning step, a resist application step, an exposure step, a development step, a chromium etching step, a chromium dry etching step, a resist removal step, and a channel dry etching step are carried out.

Figure 24I:
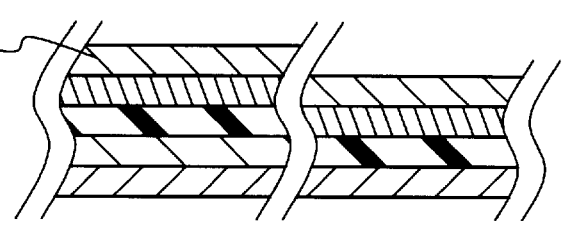
Figure 24J:
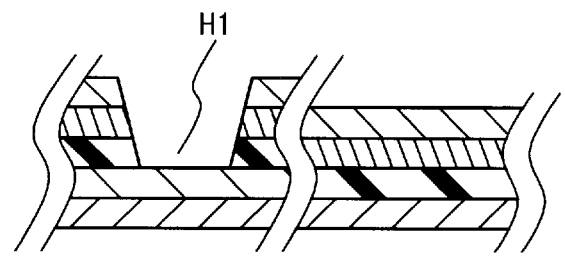

Next, as shown in FIG. 24I, the top layer (SiNx) of the passivation film 22 is formed. Then, as shown in FIG. 24J, the top layer and bottom layer of the passivation film 22, and a part of the interlayer insulating film 10 are removed from the top of the gate electrode 3 and the concave section is formed. In the process shown in FIGS. 24I and 24J, a cleaning step, a passivation CVD step, a cleaning step, a resist application step, an exposure step, a development step, a contact etching step, a contact dry etching step, and a resist removal step are carried out.

Figure 24K:
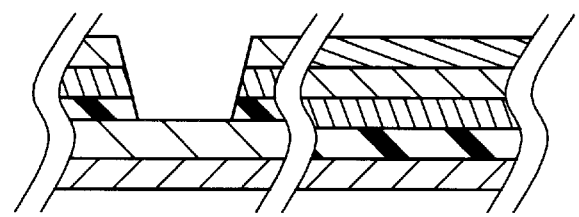
Figure 24L:
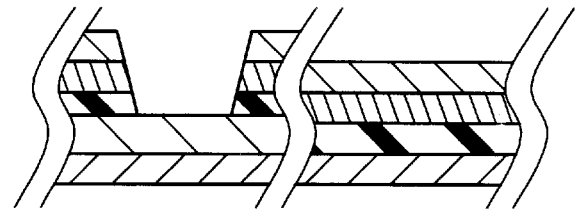

Next, in the process shown in FIG. 24K, an ITO sputtering process is carried out. Then, in the process shown in FIG. 24L, an ITO removal process is carried out. In the FIGS. 24K and 24L, a cleaning step, an ITO sputtering step, a cleaning step, a resist application step, an exposure step, a development step, an ITO etching step, a resist removal step, a cleaning step, an annealing step, and an inspection step are carried out.

FIGS. 25A to 25M are cross sectional views of the concave section in the second embodiment of the present invention along the line C–C' shown in FIG. 12.

Figure 25A:
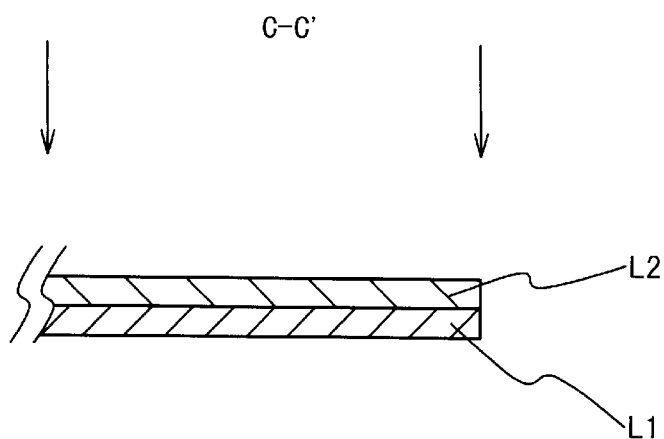
FIGS. 25A to 25M are cross sectional views of the concave section in the second embodiment of the present invention along the line C–C' shown in FIG. 12.
Figure 25B:
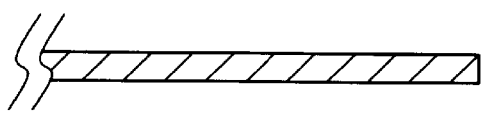

As shown in FIG. 25A, the chromium layer (Cr) is formed on the transparent substrate 9 (L1). Then, as shown in FIG. 25B, the chromium layer is removed. In the process shown in FIGS. 25A and 25B, a cleaning step, a chromium sputtering step, a cleaning step, a resist application step, an exposure step, a development step, a chromium etching step, and a resist removal step are carried out.

Figure 25C:
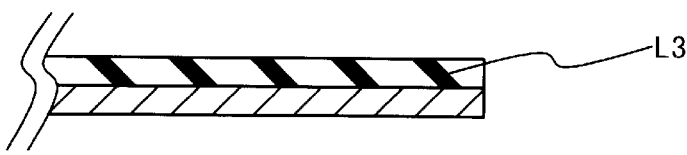
Figure 25D:
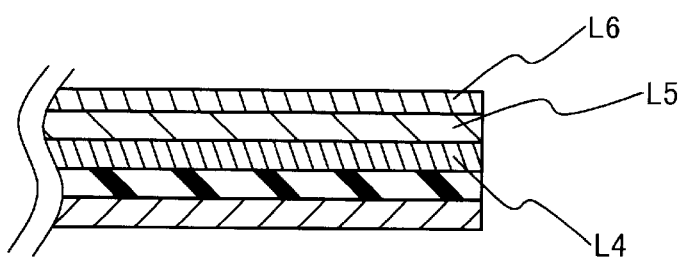
Figure 25E:
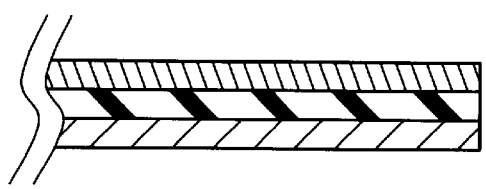

Next, as shown in FIG. 25C, the interlayer insulating film (gate insulating film) (L3) 10 of $SiO_2$ or SiNx is formed on the transparent electrode substrate 9. Then, as shown in FIG. 25D, the lower layer (L4) of SiNx in the passivation film 22 and the silicon layers (L5 and L6) of a-Si and $n^+$-aSi are formed on the interlayer insulating film 10. Then, as shown in FIG. 25E, the silicon layers of a-Si and $n^+$-aSi are removed from the top of the transparent electrode substrate 9. The process shown in FIG. 25C to 25E shows the island process. In the process, a cleaning step, a $SiO_2$ and SiNx film formation step, a cleaning step, a three-layer continuous P-CVD step, a cleaning step, a resist application step, an exposure step, a development step, an island-dry etching step, and a resist removal step are carried out.

Figure 25F:
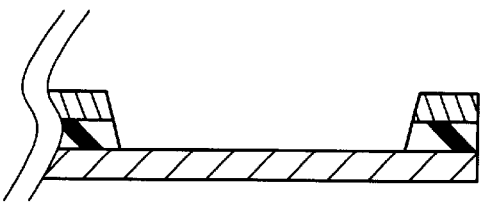

Next, as shown in FIG. 25F, a part of the bottom layer of the passivation film 22 and the interlayer insulating film 10 are removed. The process shown in FIG. 25F is a contact process. In the process, a resist application step, an exposure step, a development step, a contact dry etching step, and a resist removal step are carried out.

Figure 25G:
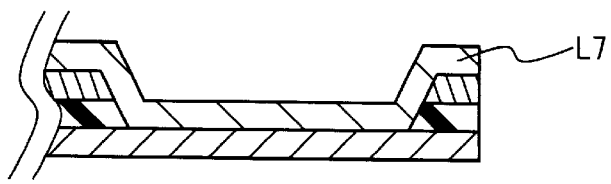
Figure 25H:
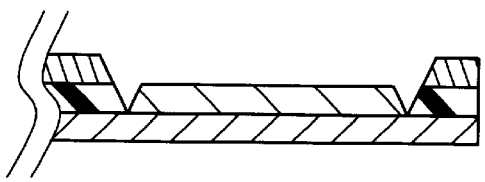
Figure 25I:
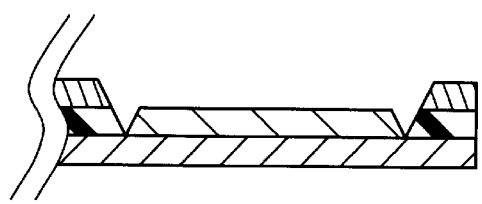

Next, as shown in FIG. 25G, the chromium layer (L7) is formed. Then, in the process shown in FIG. 25H, the chromium layer is patterned to form the data line 5. Then, in the process shown in FIG. 25I, channel dry etching is carried out. The process shown in FIG. 25G to 25I is a drain process. In the process, a cleaning step, a chromium sputtering step, a cleaning step, a resist application step, an exposure step, a development step, a chromium etching step, a chromium dry etching step, a resist removal step, and a channel dry etching step are carried out.

Figure 25J:
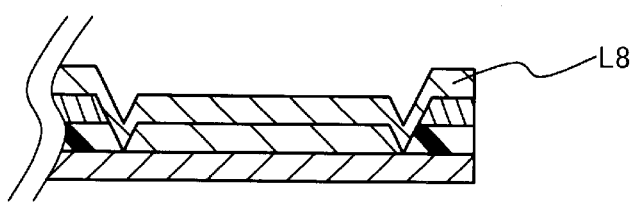
Figure 25K:
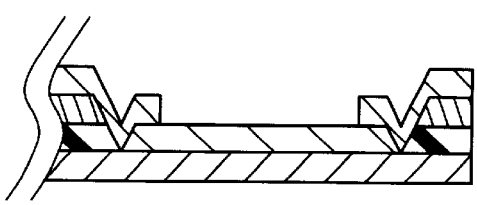

Next, as shown in FIG. 25J, the top layer (L8) of SiNx in the passivation film 22 is formed. Then, as shown in FIG. 25K, a part of the top layer of the passivation film 22 is removed from above the data line 5. In the process shown in FIGS. 25I and 25K, a cleaning step, a passivation CVD step, a cleaning step, a resist application step, an exposure step, a development step, a contact etching step, a contact dry etching step, and a resist removal step are carried out.

Figure 25L:
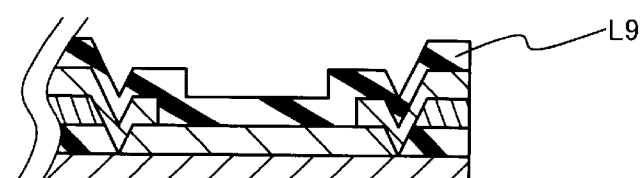
Figure 25M:
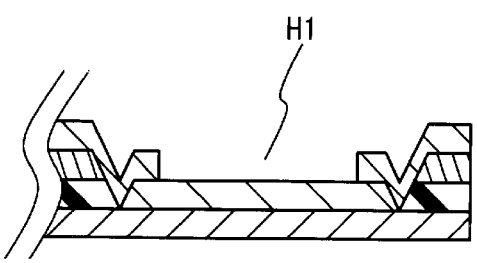

Next, as shown in FIG. 25L, a sputtering process of ITO for an orientation film (L9) 11 is carried out. Then, in the process shown in FIG. 25M, a step of removing a part of ITO is carried out. The process shown in FIGS. 25L and 25M shows a pixel process. In the process, a cleaning step, an ITO sputtering step, a cleaning step, a resist application step, an exposure step, a development step, an ITO etching step, a resist removal step, a cleaning step, an annealing step, and an inspection step are carried out.

Figure 26:
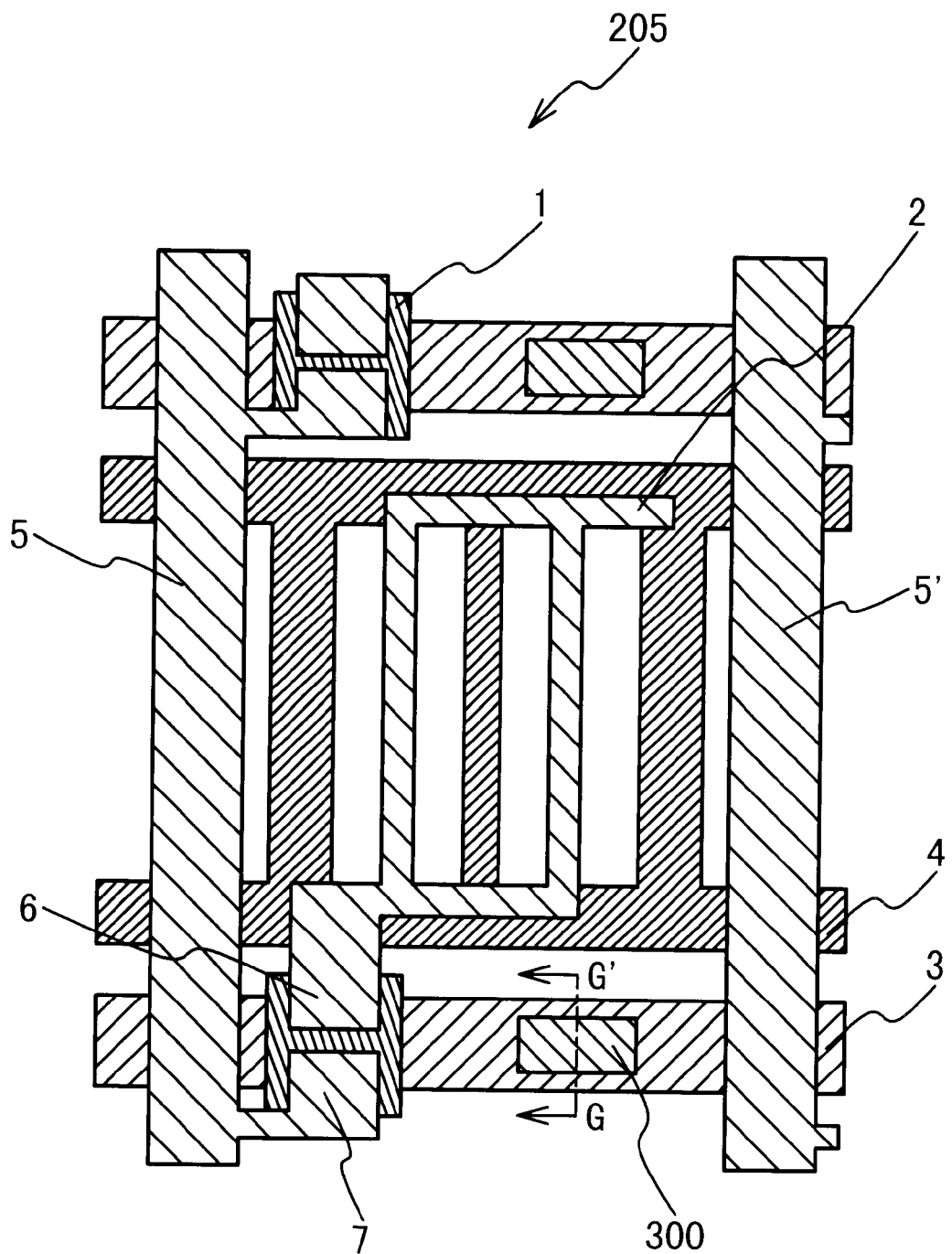
FIG. 26 is a plan view of the in-phase switching liquid crystal display apparatus according to a sixth embodiment of the present invention.

The in-phase switching liquid crystal display apparatus according to the sixth embodiment of the present invention will be described with reference to FIG. 26 and FIG. 27. In FIG. 26, the display cell 105 is composed of an amorphous silicon film 1, a pixel electrode 2, gate electrodes 3, a common electrode 4, data lines 5, a source electrode 6, a drain electrode 7, and a supporting spacer 300. The display cell is defined between adjacent gate electrodes 3 extending in a horizontal direction and between adjacent data lines 5 which are formed above the gate electrodes to extend in a vertical direction. A drive TFT transistor is formed in the lower left corner section of the display cell 105. The amorphous silicon film 1 as an insulating film is formed on the gate electrode, and the drain electrode 7 connected to the data line and a source electrode connected to the pixel electrode are formed on the amorphous silicon film 1. The common electrode 4 has a ladder shape extending in the horizontal direction and is formed below the data lines 5. The pixel electrode 2 is formed to have a rectangular ring shape above the common electrode 4. The veridical sides are provided between the steps of the ladder of the common electrode 4. The supporting spacer 300 is provided on the gate electrode 3 in a right direction of the transistor.

Figure 27:
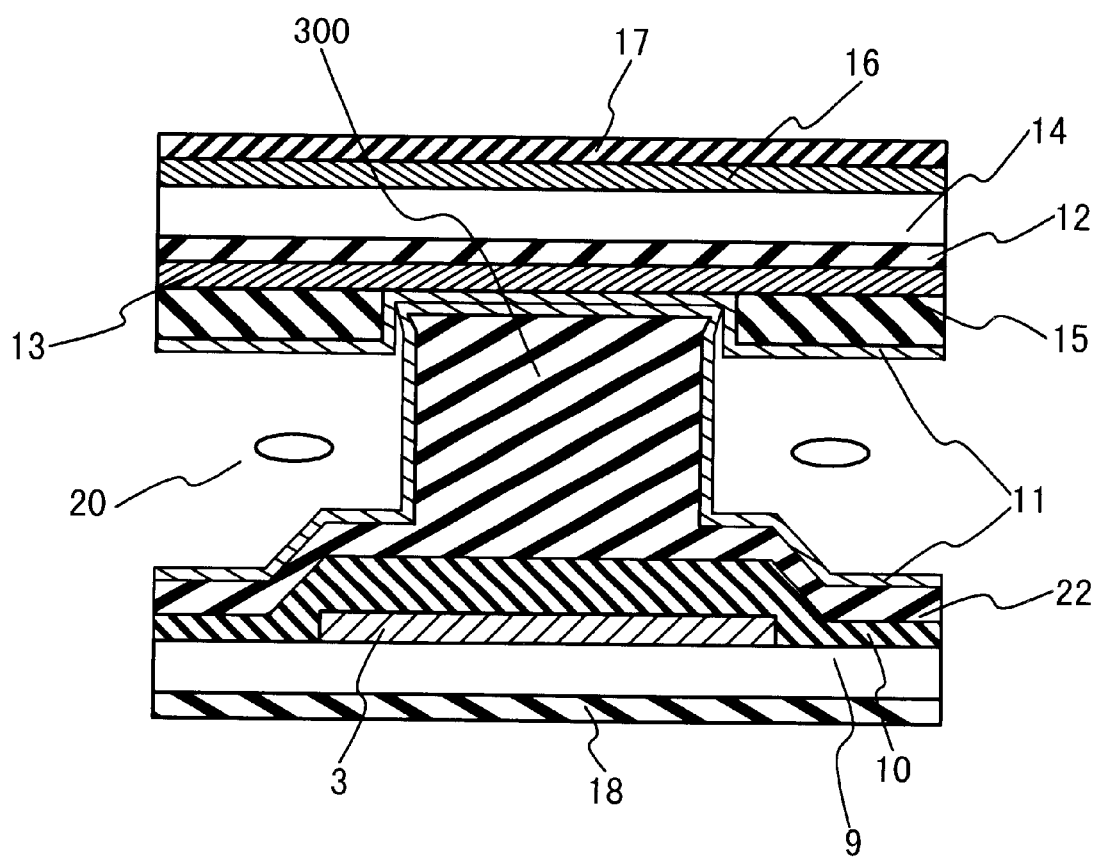
FIG. 27 is a cross sectional view showing the supporting spacer in the in-phase switching liquid crystal display apparatus according to the sixth embodiment of the present invention.

FIG. 27 is a cross sectional view of the supporting spacer 100 of the display cell 101 in the in-phase switching type liquid crystal display apparatus according to the first embodiment of the present invention along the line G–G' in FIG. 26. In FIG. 27, the upper substrate section located at the upper section of the liquid crystal layer 20 is composed of a polarizing plate 17, an electric conducting layer 16, a transparent substrate 14, a black matrix layer 12, a color layer (color filter) 13, a flattening film 15, and an orientation film 11 from the top. A concave section is formed in the flattening film 15 of the upper substrate section. The orientation film 11 covers the lower surface of the flattening film 15 and inner surface of the concave section. The lower substrate section located at the lower section of the liquid crystal layer is composed of an orientation film 11, a passivation film 22, an interlayer insulating film 10, a gate electrode 3, a transparent substrate 9, and a polarizing plate 18 from the top. The supporting spacer 300 is formed as an upward extending portion of the passivation film 22. The supporting spacer 300 may have a straight column shape but desirably has a horizontally extending top portion. The orientation film 11 fully covers the passivation film 22. The passivation film may be formed of inorganic material or organic material. The supporting spacer 300 is loaded into the concave section. When the concave section is formed in the upper substrate section, the fixing strength of the upper portion of the supporting spacer 300 is improved. In this case, the supporting spacer 300 may be formed by a part of the passivation film 22.

Figure 28:
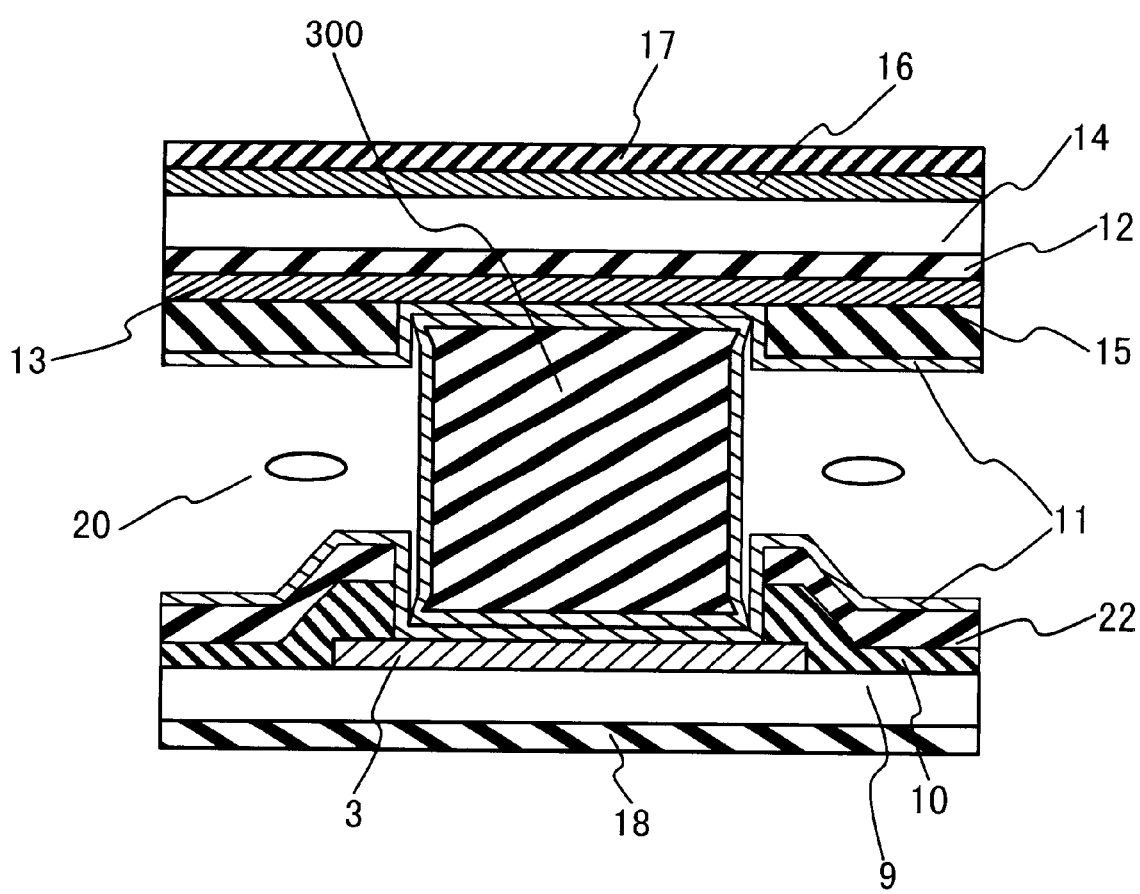
FIG. 28 is a cross sectional view showing the supporting spacer in the in-phase switching liquid crystal display apparatus according to a seventh embodiment of the present invention.

The present invention shall not be limited to the above-mentioned embodiments. In the embodiments, the concave section is provided one of the upper and lower substrate sections. However, as shown in FIG. 28, the concave section may be provided on both of the upper and lower substrate sections. This is realized by combining the first embodiment and the sixth embodiment. The concave section can greatly improve the fixing strength of the supporting spacer when the concave section to the upper portion of the supporting spacer and the concave section to the lower portion are formed.

Also, the supporting spacer may be formed of organic material or inorganic material. Especially, in the case shown in FIGS. 22 and 23, the supporting spacer may be interdentally formed from the flattening film and may be formed of metal or photosensitive material. Also, when the common electrode is formed in the upper substrate section, the common electrode and the flattening film are required to be transparent.

In addition, the present invention shall not be limited to the application of the liquid crystal display apparatus that uses an inverted stagger type thin-film transistor. The present invention can be applied to various kinds of liquid crystal display apparatuses where supporting spacers are used for keeping the display cell gap. Because the liquid crystal display apparatus according to the present invention has a predetermined strength of the supporting spacer improved, color irregularities resulting from the movement of the supporting spacer are not likely to occur. That is, the present invention can provide a liquid crystal display apparatus which is highly resistant to the stress from the outside.

What is claimed is:

1. A liquid crystal display apparatus using a thin film transistor, comprising:
   a first substrate section from which a supporting spacer extends;
   a second substrate section having a concave section that includes a lower portion formed by at least one of a gate electrode and a data line, with which a tip portion of said supporting spacer engages to keep a gap from said first substrate section, and wherein sidewalls of said concave section are formed by at least an interlayer insulation film and a passivation film; and
   a liquid crystal layer provided between said first substrate section and said second substrate section.

2. The liquid crystal display apparatus according to claim 1, wherein said supporting spacer has an extending portion in said tip portion in a direction orthogonal to a direction to which said supporting spacer extends.

3. The liquid crystal display apparatus according to claim 1, wherein said supporting spacer is covered by an orientation film, and said concave section is covered by an orientation film.

4. The liquid crystal display apparatus according to claim 1, wherein said thin film transistor has a gate electrode, a source electrode connected to a pixel electrode and a drain electrode connected to a data line extending in a direction orthogonal to a direction of said gate electrode, said supporting spacer and said concave section are provided above said gate electrode.

5. The liquid crystal display apparatus according to claim 4, wherein one of said first and second substrate sections comprises:

said pixel electrode; and a common electrode provide to drive liquid crystal molecules together with said pixel electrode.

6. The liquid crystal display apparatus according to claim 4, wherein one of said first and second substrate sections comprises said pixel electrode, and the other of said first and second substrate sections comprises a common electrode provided to drive liquid crystal molecules together with said pixel electrode.

7. The liquid crystal display apparatus according to claim 1, wherein said thin film transistor has a gate electrode, a source electrode connected to a pixel electrode and a drain electrode connected to a data line extending in a direction orthogonal to a direction of said gate electrode, said supporting spacer and said concave section are provided above said data line.

8. The liquid crystal display apparatus according to claim 7, wherein one of said first and second substrate sections comprises:

said pixel electrode; and a common electrode provide to drive liquid crystal molecules together with said pixel electrode.

9. The liquid crystal display apparatus according to claim 7, wherein one of said first and second substrate sections comprises said pixel electrode, and the other of said first and second substrate sections comprises a common electrode provided to drive liquid crystal molecules together with said pixel electrode.

10. The liquid crystal display apparatus according to claim 1, wherein said supporting spacer is formed of organic material.

11. The liquid crystal display apparatus according to claim 1, wherein said supporting spacer is formed of inorganic material.

12. The liquid crystal display apparatus according to claim 1, wherein said first substrate section comprises:

a first transparent substrate;

a light shielding layer formed in a region other than a pixel region on an opposing surface of said first transparent substrate to said second substrate section; and a flattening film formed to cover said light shielding layer, wherein said supporting spacer is formed in a region where said light shielding layer is formed.

13. The liquid crystal display apparatus according to claim 12, wherein said supporting spacer is formed from a part of said flattening film.

14. The liquid crystal display apparatus according to claim 12, wherein said flattening film is formed of transparent material.

15. The liquid crystal display apparatus according to claim 1, wherein said supporting spacer is adhered to said first substrate section.

16. The liquid crystal display apparatus according to claim 15, wherein said first substrate section has another concave section with which said supporting spacer engages, and said supporting spacer is adhered to said another concave section.

17. The liquid crystal display apparatus according to claim 15, wherein said supporting spacer is formed of metal.

18. The liquid crystal display apparatus according to claim 15, wherein said supporting spacer is formed of organic material.

* * * * *